United States Patent
Reinhard et al.

(10) Patent No.: US 10,772,322 B2
(45) Date of Patent: Sep. 15, 2020

(54) USE OF POLYMER PARTICLES CONTAINING INSECTICIDE IN ORDER TO IMPROVE THE SOIL MOBILITY OF INSECTICIDES, INSECTICIDE FORMULAS, POLYMER PARTICLES CONTAINING INSECTICIDE, AND METHOD FOR PEST CONTROL

(75) Inventors: Klaus Reinhard, Römerberg (DE); Holger Türk, Mannheim (DE); Peter Hahn, Obrigheim (DE); Tina Schröder-Grimonpont, Rheinzabern (DE); Michael Ishaque, Ludwigshafen (DE); Marc Rudolf Jung, Worms (DE)

(73) Assignee: BASF SE, Lugwigshafen (DE)

( * ) Notice: Subject to any disclaimer, the term of this patent is extended or adjusted under 35 U.S.C. 154(b) by 0 days.

(21) Appl. No.: 13/500,121

(22) PCT Filed: Oct. 7, 2010

(86) PCT No.: PCT/EP2010/064995
§ 371 (c)(1),
(2), (4) Date: Apr. 4, 2012

(87) PCT Pub. No.: WO2011/042495
PCT Pub. Date: Apr. 14, 2011

(65) Prior Publication Data
US 2012/0214857 A1  Aug. 23, 2012

(30) Foreign Application Priority Data
Oct. 7, 2009  (EP) ..................................... 09172450

(51) Int. Cl.
*A01N 25/04*  (2006.01)
*A01N 47/02*  (2006.01)

(52) U.S. Cl.
CPC ............. *A01N 25/04* (2013.01); *A01N 47/02* (2013.01)

(58) Field of Classification Search
CPC ...... A01N 25/04; A01N 25/006; A01N 47/02; A01N 25/28
See application file for complete search history.

(56) References Cited

U.S. PATENT DOCUMENTS

| | | | |
|---|---|---|---|
| 4,303,642 A | 12/1981 | Kangas | |
| 5,508,035 A | 4/1996 | Wessling et al. | |
| 5,846,554 A | 12/1998 | Scher et al. | |
| 2008/0146448 A1* | 6/2008 | Dyllick-Brenzinger et al. | 504/358 |
| 2008/0213326 A1* | 9/2008 | Amrhein et al. | 424/405 |

FOREIGN PATENT DOCUMENTS

| | | |
|---|---|---|
| EP | 0 374 796 | 6/1990 |
| EP | 0 543 027 | 5/1993 |
| EP | 1 840 145 | 10/2007 |
| WO | WO 97/44125 | 11/1997 |
| WO | WO 01/94001 | 12/2001 |
| WO | WO 01/94002 | 12/2001 |
| WO | WO 2006/015791 | 2/2006 |
| WO | WO 2009/063257 | 5/2009 |

OTHER PUBLICATIONS

International Preliminary Report on Patentability, PCT/EP2010/64995, filed Oct. 7, 2010.
International Search Report, PCT/EP2010/64995, dated Nov. 29, 2011.
All et al., "Persistence and Bioactivity of Encapsulated and Emulsified Formulations of Methyl Parathion in Soil of Grape Vineyards Infested with the Grape Root Borer", Journal of Economic Entomology, Apr. 1978, vol. 71, No. 2, pp. 236-238.
Bowman, "Mobility and Persistence of Isazofos in Granular and Microencapsulated Formulations in Two Soils, using Field Lysimeters", Pesticide Science, 1992, vol. 36, pp. 181-188.
Davis et al., "Microencapsulated Chlorpyrifos Distribution in Loamy Sand and Silty Clay Loam Soils When Applied with a Sub-Slab Injector for Subterranean Termite Control", Bull. Environ. Contam. Toxicol., 1993, vol. 50, No. 3, pp. 458-465.
Isenmann, "In Situ Microencapsulation of Fipronil from its commercial concentrate", French-Brazilian Meeting on Polymers, 2005, XP002599500.
Smith et al., "Activity and Water-Induced Movement of Termiticides in Soil", Journal of Economic Entomology, Apr. 1992, vol. 85, No. 2, pp. 430-434.

* cited by examiner

*Primary Examiner* — Johann R Richter
*Assistant Examiner* — Danielle Sullivan
(74) *Attorney, Agent, or Firm* — Marshall, Gerstein & Borun LLP

(57) ABSTRACT

Polymer particles, comprising
a) at least one sparingly soluble insecticide from the group consisting of fipronil, allethrin, alpha-cypermethrin, beta-cyfluthrin, bifenthrin, bioallethrin, 4-chloro-2-(2-chloro-2-methylpropyl)-5-[(6-iodo-3-pyridinyl) methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin and
b) at least one water-insoluble polymer,
are suitable for improving the soil mobility of the sparingly soluble insecticide(s).

8 Claims, No Drawings

USE OF POLYMER PARTICLES CONTAINING INSECTICIDE IN ORDER TO IMPROVE THE SOIL MOBILITY OF INSECTICIDES, INSECTICIDE FORMULAS, POLYMER PARTICLES CONTAINING INSECTICIDE, AND METHOD FOR PEST CONTROL

This application is a National Stage application of International Application No. PCT/EP2010/064995 filed Oct. 7, 2010, the entire contents of which is hereby incorporated herein by reference. This application also claims priority under 35 U.S.C. § 119 to EP Patent Application No. 09172450.0, filed Oct. 7, 2009, the entire contents of which is hereby incorporated herein by reference.

The invention relates to the use of insecticide-comprising polymer particles for increasing the soil mobility of insecticides, insecticide-comprising polymer particles, insecticide formulations, a process for preparing insecticide formulations, a method for increasing the soil mobility of insecticides and a method for controlling soil-dwelling pests, in particular termites.

Many pesticides comprise active ingredients which have barely any soil mobility or none whatsoever after application. In particular cases, however, increased and controlled soil mobility of insecticides is advantageous, for example in the control of soil-dwelling pests, such as certain nematodes and in particular termites.

When the intention is to transfer active ingredients with low soil mobility into deeper soil layers, the options available are almost exclusively mechanical: the digging of trenches and direct treatment of the trench walls, and the spraying of the active ingredient formulation under pressure into deeper soil layers are examples thereof. Such methods require a high degree of labor and/or equipment. In addition, the use of particular formulation auxiliaries is also known, in order to increase the soil mobility of active ingredients. WO 03/053345 describes the use of specific water-soluble adjuvants with which the soil mobility of particular active ingredients, in particular pyrethroids, is improved by at least 20%. The adjuvants include polymers, such as modified polyethers.

Pesticide Science (1992), 36, 181-188 examines the effect of various isazofos formulations on the soil mobility of isazofos. Here, isazofos is applied in microencapsulated form, as granules and in the form of an emulsifiable concentrate (EC) to soils. The mobility of the active ingredient is determined using lysimeters. In the study, the microencapsulated formulation had the lowest soil mobility by a wide margin.

Journal of Economic Entomology (1978), 71, 236-238 examines the persistency and soil mobility of methyl parathion in encapsulated and in emulsified form (EC). To this end, the formulations are used in vineyards for controlling the grape root borer. With regard to persistency and mobility, there were no differences found between the formulations tested.

Bull. Environ. Contam. Toxicol. (1993), 50 No. 3, 458-465 uses chlorpyrifos in microencapsulated form. To this end, the insecticide is injected through a concrete cover into the soil below. The persistency of the active ingredient and the horizontal and vertical distribution are examined. The experiments with chlorpyrifos in microencapsulated form showed no differences with regard to the results obtained in earlier studies with emulsifiable concentrates (EC) of chlorpyrifos.

Journal of Economic Etomolgy (1992), 85, No. 2, 430-43 examines the mobility of cypermethrin, chlorpyrifos and chlordane. For chlorpyrifos, the formulation types TC (termite concentrate), LO (low odor), WP (wettable powder) and ME (microencapsulated) are used. The different chlorpyrifos formulations show no significant differences with regard to soil mobility.

U.S. Pat. No. 4,303,642 describes polymer latices for improving the soil mobility of chlorpyrifos and chlorpyrifosmethyl. The chlorpyrifos is dissolved together with the latex in water, and the chlorpyrifos forms a homogeneous solution in the latex. The latexes used are in particular styrene-based polymers. However, this process is not suitable for introducing active ingredients having a melting point of more than 100° C. via the aqueous phase into the polymer latex.

Even though good results are already achieved with the systems described, there is a great deal of room for improvement.

It is an object of the invention to provide application forms which improve the soil mobility of sparingly soluble insecticides which are highly absorptive to the soil, such that the insecticide gets into deeper soil layers with reduced labor, if any. It is a further object of the present invention to provide an insecticide formulation in particular for controlling termites, which formulation improves the soil mobility of sparingly soluble insecticides.

It has been found that the soil mobility of sparingly soluble insecticides from the group consisting of fipronil, allethrin, alpha-cypermethrin, beta-cyfluthrin, bifenthrin, bioallethrin, 4-chloro-2-(2-chloro-2-methylpropyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin can be increased when they are formulated in the form of polymer particles.

The invention therefore provides for the use of polymer particles comprising a) at least one sparingly soluble insecticide from the group consisting of fipronil, allethrin, alpha-cypermethrin, beta-cyfluthrin, bifenthrin, bioallethrin, 4-chloro-2-(2-chloro-2-methylpropyl)-5-[(6-iodo-3-pyridinyl)methoxy]-3 (2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin and b) at least one water-insoluble polymer for improving the soil mobility of the sparingly soluble insecticide(s).

The invention furthermore provides polymer particles (i) comprising at least one sparingly soluble insecticide from the group consisting of fipronil, allethrin, alpha-cypermethrin, beta-cyfluthrin, bifenthrin, bioallethrin, 4-chloro- 2-(2-chloro-2-methylpropyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin, where the polymer particles (ii) comprise at least one polymer from the group of the polymers P1-P4 obtainable by P1) polymerization of
  M1.1) 30 to 100% by weight, based on P1, of at least one monomer (M I) selected from the group of the $C_1$-$C_{24}$-alkyl esters of acrylic acid, $C_1$-$C_{24}$-alkyl esters of methacrylic acid and methacrylonitrile,
  M1.2) 0 to 70% by weight, based on P1, of at least one monomer (M II), selected from the group of polyfunctional monomers, and
  M1.3) 0 to 40% by weight, based on P1, of at least one further monomer (M III) which is structurally different from monomers (M I) and (M II);
P2) polymerization of
  M2.1) 30 to 100% by weight, based on P2, of at least one styrene derivative (M IV),
  M2.2) 0-70% by weight, based on P2, of at least one vinyl monomer (M V) which is different from monomer (M IV), and
  M2.3) 0-40% by weight, based on P2, of at least one monomer (M VI) which is different from monomers (M IV) and (M V);
P3) polycondensation of
  M3.1) melamine formaldehyde prepolymers (M VII) and/or
  M3.2) alkyl ethers of melamine formaldehyde prepolymers (M VIII) and
P4) polyaddition of
  M4.1) 30-100% by weight, based on P4, of at least one isocyanate derivative (M XIII),
  M4.2) 0-70% by weight, based on P4, of at least one amino compound (M XIV), and
  M4.3) 0-70% by weight, based on P4, of at least one alcohol (M XV).

The invention furthermore provides a process for preparing the insecticide-comprising polymer particles, insecticide formulations, a process for preparing the insecticide formulations, a method for increasing the soil mobility of the insecticides mentioned above where an insecticide formulation according to the invention is applied to the soil to be treated and a method for controlling soil-dwelling pests, in particular termites where an insecticide formulation according to the invention is applied in the habitat of the pests. In the context of the present invention, in addition to the soil and earth, "habitat of the soil-dwelling pests, in particular termites" is also understood to include materials such as wood, gypsum, cement, fibers and tissues. Preferred habitat is in particular the soil at depths of 0.1-50 inches, preferably 0.1-20 inches, more preferably 0.1-10 inches and especially preferably 0-6 inches.

The invention allows the soil mobility of sparingly soluble insecticides from the group consisting of fipronil, allethrin, alpha-cypermethrin, beta-cyfluthrin, bifenthrin, bioallethrin, 4-chloro-2-(2-chloro-2-methylpropyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin to be increased markedly.

This is advantageous in particular in the control of termites. Moreover, on soil application, the insecticide formulations according to the invention show increased biological activity. Furthermore, the physical stability of the polymer particles and the insecticide formulations obtained therefrom and the spray liquors obtained therefrom are improved. In some cases, it is possible to reduce the amount of insecticide required markedly compared to conventional insecticide formulations. In addition, the use of insecticide-comprising polymer particles allows the use of more highly concentrated insecticide formulations, so that the amount of water required for the application is reduced. Thus, in the use according to the invention of insecticide-comprising particles, less water has to be applied compared to conventional insecticide formulations.

According to the invention, the term "insecticide formulation" comprises both the formulation in concentrated form, for example as a solid or in liquid form, and in diluted form for example as a spray liquor.

Suitable for the use according to the invention are polymer particles comprising at least one sparingly soluble insecticide from the group consisting of fipronil, allethrin, alpha-cypermethrin, beta-cyfluthrin, bifenthrin, bioallethrin, 4-chloro-2-(2-chloro-2-methylpropyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen and tebufenozide.

Unless evident otherwise from the context, the term "sparingly soluble" relates to the solubility in water and means in the context of the invention that the active insecticidal ingredient has a water solubility of less than 1 g/l, preferably less than 0.65 g/l, particularly preferably less than 0.2 g/l, especially less than 0.1 g/l, at 25° C. and 1013 mbar.

The mobility of an active ingredient in the soil depends essentially on the soil absorption coefficient $K_{o/c}$. In principle, an increased water solubility is not an indication of a better soil mobility.

The sparingly soluble insecticides used in accordance with the invention and any optional further active ingredients preferably have a soil absorption coefficient $K_{o/c}$ of >250, particularly preferably >400.

The $K_{o/c}$ describes the distribution of an active ingredient between the organic component of the soil and an aqueous solution. High $K_{o/c}$ values show strong binding of the active ingredients to the organic soil substance; the soil mobility is therefore lower than in the case of those active ingredients with lower $K_{o/c}$ values. The $K_{o/c}$ value is calculated by the formula:

$$K_{o/c} = K_d \times 100 / C_{org} \, [\%]$$

where the $K_d$ value denotes the soil/water partition coefficient for an active ingredient equilibrium and $C_{org}$ the carbon content of the soil in %.

The experimental procedure in $K_{o/c}$ value determinations is described in detail in OECD guideline no. 106. In this procedure, a suspension of soil and 0.01 M $CaCl_2$ solution is prepared. To this suspension is added (preferably radiolabeled) active ingredient in (in the simplest case) one concentration dissolved in a very small amount of organic solvent, and the mixture is shaken gently. When an equilibrium of the concentrations of the active ingredient in the two phases has formed after a few hours, the concentration in the soil and in the $CaCl_2$ solution is determined. The quotient of the concentrations in the soil and in the $CaCl_2$ solution are used to obtain the $K_d$ value, from which the $K_{o/c}$ value for the particular soil results taking account of the organic carbon content of the soil. According to the invention, standard soil is considered to be "LUFA 2.3" soil (sandy loam [according to USDA classification] with a pH of approx. 7 (measured in $CaCl_2$) and an organic carbon content of approx. 1.1%).

Low-mobility active ingredients are considered to be those having a $K_{o/c}$ value of >250.

The insecticides used in accordance with the invention and any optional further active ingredients preferably have a water solubility of <1.0 g/l at 25° C. and 1013 mbar and a $K_{o/c}$ value of >250.

Suitable for the use according to the invention are preferably polymer particles comprising at least one of the sparingly soluble insecticides mentioned above and at least one water-insoluble polymer from the group consisting of P1 to P4.

Preferred polymers P1 can be obtained by polymerization of

M1.1) 30 to 100% by weight, based on P1, of at least one monomer (M I) selected from the group of the $C_1$-$C_{24}$-alkyl esters of acrylic acid, $C_1$-$C_{24}$-alkyl esters of methacrylic acid and methacrylonitrile, M1.2) 0 to 70% by weight, based on P1, of at least one monomer (M II), selected from the group of polyfunctional monomers, and M1.3) 0 to 40% by weight, based on P1, of at least one further monomer (M III) which is structurally different from monomers (M I) and (M II).

Preferred as monomers (M I) are $C_1$-$C_{24}$-alkyl esters of acrylic and methacrylic acid, and also methacrylonitrile. Preferred monomers (M I) are methyl acrylate, ethyl acrylate, n-propyl acrylate, isopropyl acrylate, n-butyl acrylate, isobutyl acrylate, sec-butyl acrylate and tert-butyl acrylate and stearyl acrylate, and also methyl methacrylate, ethyl methacrylate, n-propyl methacrylate, isopropyl methacrylate, n-butyl methacrylate, isobutyl methacrylate, sec-butyl methacrylate, tert-butyl methacrylate and methacrylonitrile and mixtures of the monomers mentioned above. From among the monomers mentioned above, preference is given to the methacrylates. Particular preference is given to methyl acrylate, ethyl acrylate, isopropyl acrylate, n-butyl acrylate and tert-butyl acrylate and methyl methacrylate, ethyl methacrylate, isopropyl methacrylate, n-butyl methacrylate, tert-butyl methacrylate and stearyl acrylate. Methyl methacrylate, n-butyl acrylate and stearyl acrylate are especially preferred.

Suitable monomers (M II) are polyfunctional monomers which are sparingly soluble, if at all, in water but have good to limited solubility in lipophilc substances. The sparing solubility of the monomers (M II) is to be understood as meaning a solubility of <60 g/l at 20° C. and 1013 mbar in water.

In the context of the invention, polyfunctional monomers are understood as meaning monomers having at least two non-conjugated double bonds. Preferred polyfunctional monomers are divinyl or polyvinyl monomers; esters of diols or polyols with acrylic acid; esters of diols or polyols with methacrylic acid; ethers of diols or polyols and allyl alcohol and ethers of diols or polyols and vinyl alcohol.

Particularly preferred monomers (M II) having two non-conjugated double bonds are 1,2-ethanediol diacrylate, 1,3-propanediol diacrylate, 1,4-butanediol diacrylate, 1,5-pentanediol diacrylate and 1,6-hexanediol diacrylate, 1,2-ethanediol dimethacrylate, 1,3-propanediol dimethacrylate, 1,4-butanediol dimethacrylate, 1,5-pentanediol dimethacrylate and 1,6-hexanediol dimethacrylate, divinylbenzene, ethylene glycol dimethacrylate, 1,3-butylene glycol dimethacrylate, methallylmethacrylamid and allyl methacrylate. Very particular preference is given to 1,3-propanediol diacrylate, 1,4-butanediol diacrylate, 1,5-pentanediol diacrylate and 1,6-hexanediol diacrylate, 1,3-propanediol dimethacrylate, 1,4-butanediol dimethacrylate, 1,5-pentanediol dimethacrylate and 1,6-hexanediol dimethacrylate.

Preferred monomers (M II) having more than two non-conjugated double bonds are trimethylolpropane triacrylate, trimethylolpropane trimethacrylate, pentaerythritol triallyl ether, pentaerythritol triacrylate and pentaerythritol tetraacrylate and mixtures thereof.

Suitable monomers (M III) are monomers IIIa) such as butanediene, isoprene, vinyl acetate, vinyl propionate and vinylpyrridine and IIIb) water-soluble monomers such as acrylonitrile, methacrylamide, acrylic acid, methacrylic acid, itaconic acid, maleinic acid, maleic anhydride, N-vinylpyrrolidone, 2-hydroxyethyl acrylate, 2-hydroxyethyl methacrylate and acrylamido-2-methylpropanesulfonic acid, N-methylolacrylamide, N-methylolmethacrylamide, dimethylaminoethyl methacrylate and diethylaminoethyl methacrylate. Especially suitable are N-methylolacrylamide, N-methylolmethacrylamide, dimethylaminoethyl methacrylate and diethylaminoethyl methacrylate. Particular preference is given to the free acids, i.e. acrylic acid and in particular methacrylic acid, of the acrylates mentioned under M I.

Preferred polymers P1 can be obtained by polymerization of

M1.1) 30 to 100% by weight based on P1, of at least one monomer (M I) selected from the group consisting of methyl acrylate, ethyl acrylate, isopropyl acrylate, n-butyl acrylate and tert-butyl acrylate and methyl methacrylate, ethyl methacrylate, isopropyl methacrylate, n-butyl methacrylate, tert-butyl methacrylate and stearyl acrylate;

M1.2) 0 to 70% by weight, based on P1, of at least one monomer (M II) selected from the group consisting of butanediol diacrylate, trimethylolpropane triacrylate, trimethylolpropane trimethacrylate, pentaerythritol triallyl ether, pentaerythritol triacrylate and pentaerythritol tetraacrylate and also M1.3.) 0 to 40% by weight, based on P1, of acrylic acid and/or methacrylic acid.

Particularly preferred polymers P1 can be obtained by polymerization of

M1.1) 30-100% by weight based on P1, of at least one monomer (M I) selected from the group consisting of methyl methacrylate, stearyl acrylate and n-butyl acrylate;

M1.2) 0 to 70% by weight, based on P1, of at least one monomer (M II) selected from the group consisting of butanediol diacrylate, trimethylolpropane triacrylate, trimethylolpropane trimethacrylate, pentaerythritol triallyl ether, pentaerythritol triacrylate and pentaerythritol tetraacrylate and also M1.3) 0 to 40% by weight, based on P1, acrylic acid or methacrylic acid.

In a preferred embodiment, the polymer P1 can be obtained by polymerization of 30-80% by weight, based on P1, of component M1.1,
20-60% by weight, based on P1, of component M1.2 and
5-60% by weight, based on P1, of component M1.3.

Polymer P1 can be obtained by processes known to the person skilled in the art, for example by free-radical, anionic or cationic polymerization in the absence of a solvent, in a solution, in a dispersion or in an emulsion. Preference is given to free-radical polymerization. Particular preference is given to aqueous free-radical emulsion polymerization, suspension polymerization and aqueous free-radical mini-emulsion polymerization. In a particularly preferred embodiment, the polymer particle comprises, as component M1.3 (M III), methacrylic acid in amounts of 1-50% by weight, preferably 1-20% by weight, in each case based on P1.

Suitable polymers P2 can be obtained by polymerization of

M2.1) 30 to 100% by weight, based on P2, of at least one styrene derivative (M IV),
M2.2) 0-70% by weight, based on P2, of at least one vinyl monomer (M V) which is different from monomer (M IV), and
M2.3) 0-40% by weight, based on P2, of at least one monomer (M VI) which is different from monomers (M IV) and (M V).

Suitable monomers (M IV) are, for example, styrene, alpha-methylstyrene, beta-methylstyrene and ring-substituted alkylstyrenes. Preferred monomers (M IV) are styrene, alpha-methylstyrene and beta-methylstyrene. Styrene is especially preferred.

Suitable monomers (M V) are, preferably, compounds having two or more non-conjugated double bonds, such as butanediol vinyl ether, diethylene glycol divinyl ether, triethylene glycol divinyl ether, cyclohexanedimethanol divinyl ether and allyl methacrylate.

Suitable monomers (M VI) are, preferably, methyl vinyl ether, ethyl vinyl ether, n-butyl vinyl ether, isobutyl vinyl ether and tert-butyl vinyl ether, and also vinyl acetate.

Polymer P2 can likewise be obtained by the methods described for P1, which are known to the person skilled in the art.

Suitable polymers P3 can be obtained by polycondensation of the prepolymers (M VII) and/or (M VIII).

Polymers P3 can be obtained by known polycondensation reactions which are familiar to the person skilled in the art. The preparation of melamine formaldehyde resins and capsules is described, for example, in EP 0 974 394, U.S. Pat. No. 4,172,119, EP-A 0 026 914 and EP-A 0 218 887.

Preferred polymers P4 can be obtained by polyaddition of

M4.1) 30-100% by weight, based on P4, of at least one isocyanate derivative (M XIII),
M4.2) 0-70% by weight, based on P4, of at least one amino compound (M XIV), and/or
M4.3) 0-70% by weight, based on P4, of at least one alcohol (M XV).

Suitable isocyanate derivatives (M XIII) are all isocyanates having two or more isocyanate groups. Suitable isocyanates are 1,2-ethylene diisocyanate, 1,4-tetramethylene diisocyanate, 1,6-hexamethaylene diisocyanate, 1,4-phenylene diisocyanate, 2,4-toluylene diisocyanate, 2,6-toluylene diisocyanate, biphenyl-4,4'-ylene diisocyanate, diphenylmethane-4,4'-diyl diisocyanate, naphthylene diisocyanate, isophorone diisocyanate, diphenylmethane diisocyanate, tetramethylxylene diisocyanate and isomers/homologs of the compounds mentioned above, and also mixtures of these compounds. Suitable are furthermore polyisocyanates, such as derivatives having biuret structure, polyuretoimines and isocyanurates, for example 3-isocyanomethyl-3,5,5-trimethylcyclohexyl isocyanate, and also polymers of hexamethylene diisocyanate and ethylene oxide. Preference is given to 1,6-hexamethylene diisocyanate, isophorone diisocyanate, diphenylmethane diisocyanat and also its homologs and isomers, tetramethylxylene diisocyanate and also polymers of hexamethylene diisocyanate and ethylene oxide. Especially preferred are 1,6-hexamethylene diisocyanate and isophorone diisocyanate.

Suitable amino compounds (M XIV) are hydrazine, guanidine and its salts, hydroxylamine, di- and polyamines and aminoalcohols. Preference is given to diethylenetriamine and N,N'-bis-(3-aminopropyl)ethylenediamine.

Suitable alcohols (M XV) are all di- and polyalcohols. Suitable are furthermore ethoxylated and propoxylated di- and polyalcohols.

Polyaddition processes and the associated monomers (M XII-MXV) are described, for example, in U.S. Pat. No. 4,021,595, EP 0 392 876 and EP 0 535 384.

In addition to at least one polymer of the group of polymers P1 to P4, the polymer particles used in accordance with the invention comprise at least one sparingly soluble insecticide from the group consisting of fipronil, allethrin, alpha-cypermethrin, beta-cyfluthrin, bifenthrin, bioallethrin, 4-chloro-2-(2-chloro-2-methylpropyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin.

In a preferred embodiment, the polymer particles comprise at least one sparingly soluble insecticide from the group consisting of fipronil, allethrin, beta-cyfluthrin, bifenthrin, bioallethrin, 4-chloro-2-(2-chloro-2-methylpropyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, deltamethrin, etofenprox, fenoxycarb, flufenoxuron, hydramethylnon, imidacloprid, indoxacarb, metaflumizone, permethrin, pyriproxifen, tebufenozide and tralomethrin.

In a more preferred embodiment, the polymer particles used in accordance with the invention comprise at least one insecticide from the group consisting of fipronil, alpha-cypermethrin, bifenthrin, chlorantraniliprole, chlorfenapyr, cyfluthrin, cypermethrin, cyantraniliprole, deltamethrin, etofenprox, hydramethylnon, indoxacarb, metaflumizone and permethrin.

In a more preferred embodiment, the polymer particles used in accordance with the invention comprise at least one insecticide from the group consisting of fipronil, bifenthrin, chlorantraniliprole chlorfenapyr, cyfluthrin, cyantraniliprole, deltamethrin, etofenprox, hydramethylnon, indoxacarb, metaflumizone and permethrin.

Particular preference is given to fipronil.

Optionally, the polymer particles comprise, in addition to at least one of the sparingly soluble insecticides mentioned above, one or more further active ingredients, in particular further sparingly soluble pesticidal active ingredients, such as commercially available insecticides and fungicides. These are listed, for example, under http://www.hclrss.demon.co.uk/index_cn_frame.html (Index of common names). The following insecticides and fungicides may be mentioned by way of example:

Insecticides include, for example, organo(thio)phosphates, such as acephate, azamethiphos, azinphos-ethyl, azinphos-methyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, isoxathion, malathion, mecarbam, methamidophos, methidathion, parathion-methyl, mevinphos, monocrotophos, nalad, omethoate, oxydemeton-methyl, paraoxon, parathion, parathion-methyl, phenthoate, phorate, phosalone, phosmet, phosphamidon, phoxim, pirimiphos, pirimiphos-methyl, profenofos, propetamphos, prothiofos, pyraclofos, pyridaphenthion, quinalphos, sulfotep, sulprofos, tebupirimfos, temephos, terbufos, tetrachlorvinphos, thiometon, triazophos, trichlorfon, vamidothion;

carbamates, such as alanycarb, aldicarb, bendiocarb, benfuracarb, butocarboxim, butoxycarboxim, carbaryl, carbofuran, carbosulfan, ethiofencarb, fenobucarb, formethanate, furathiocarb, isoprocarb, methiocarb, methomyl, metolcarb, oxamyl, pirimicarb, propoxur, thiodicarb, thiofanox, triazamate, trimethacarb, XMC, xylylcarb;

pyrethroids, such as acrinathrin, d-cis-trans-allethrin, d-trans-allethrin, bioallethrin S-cyclopentenyl, bioresmethrin, cycloprothrin, lambda-cyhalothrin, gamma-cyhalothrin, cyphenothrin, beta-cypermethrin, theta-cypermethrin, zeta-cypermethrin, empenthrin, esfenvalerate, fenpropathrin, fenvalerate, flucythrinate, flumethrin, tau-fluvalinate, halfenprox, imiprothrin, phenothrin, prallethrin, profluthrin, pyrethrin I and II, resmethrin, RU 15525, silafluofen, tau-fluvalinate, tefluthrin, tetramethrin, transfluthrin, dimefluthrin, ZXI 8901;

arthropodal growth regulators: a) chitin synthesis inhibitors, e.g. benzoylureas, such as bistrifluron, chlorfluazuron, diflubenzuron, flucycloxuron, hexaflumuron, lufenuron, novaluron, noviflumuron, teflubenzuron, triflumuron, buprofezin, diofenolan, hexythiazox, etoxazole, clofentezine; b) ecdysone antagonists, such as chlormafenozide, halofenozide, methoxyfenozide, azadirachtin; c) juvenile hormone mimetics, such as pyriproxyfen, hydroprene, kinoprene, methoprene; d) lipid biosynthesis inhibitors, such as spirodiclofen, spiromesifen, spirotetramat;

nicotine receptor agonists/antagonists: acetamiprid, clothianidin, dinotefuran, nitenpyram, thiacloprid, thiamethoxam, nicotine, bensultap, cartap hydrochloride, thiocyclam, thiosultap-sodium and AKD1022;

GABA antagonists, such as acetoprole, chlordane, endosulfan, ethiprole, gamma-HCH (lindane), vaniliprole, pyrafluprole, pyriprole, phenylpyrazole compounds of the formula $I^{-1}$

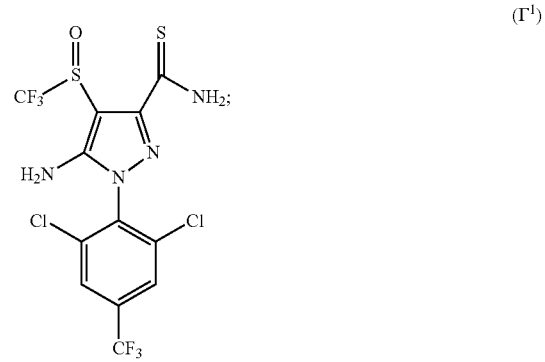 [SMILES: NC(=S)c1nn(-c2c(Cl)cc(C(F)(F)F)cc2Cl)c(N)c1S(=O)C(F)(F)F]

macrocyclic lactones, such as abamectin, emamectin, emamectin benzoate, milbemectin, lepimectin, spinosad;

METI I compounds, such as fenazaquin, fenpyroximate, flufenerim, pyridaben, pyrimidifen, rotenone, tebufenpyrad, tolfenpyrad;

METI II and III compounds, such as acequinocyl, fluacypyrim;

decoupling compounds, such as DNOC;

inhibitors of oxidative phosphorylation, such as azocyclotin, cyhexatin, diafenthiuron, fenbutatin oxide, propargite, tetradifon;

molting inhibitors: cyromazine, chromafenozide, halofenozide, methoxyfenozide;

synergists, such as piperonyl butoxide and tribufos;

sodium channel blockers;

selective antifeedants: cryolite, pymetrozine, flonicamid;

mite growth inhibitors: clofentezine, hexythiazox, etoxazole;

chitin synthesis inhibitors, such as buprofezin, bistrifluron, chlorfluazuron, diflubenzuron, flucycloxuron, hexaflumuron, lufenuron, novaluron, noviflumuron, teflubenzuron, triflumuron;

lipid biosynthesis inhibitors, such as spirodiclofen, spiromesifen, spirotetramat;

octopaminergic agonists, such as amitraz;

ryanodine receptor modulators, such as flubendiamide;

various: amidoflumet, benclothiaz, benzoximate, bifenazate, bromopropylate, cyenopyrafen, cyflumetofen, quinomethionate, dicofol, fluoroacetate, pyridalyl, pyrifluquinazon, N-R'-2,2-dihalo-1-R"-cyclopropanecarboxamide 2-(2,6-dichloro-α,α,α-trifluoro-p-tolyl)hydrazone, N-R'-2,2-di(R''') propionamide 2-(2,6-dichloro-α,α,α-trifluoro-p-tolyl) hydrazone, in which R' is methyl or ethyl, halo is chlorine or bromine, R" is hydrogen or methyl and R''' is methyl or ethyl;

malononitrile compounds, such as $CF_3(CH_2)_2C(CN)_2$ $CH_2(CF_2)_3CF_2H$, $CF_3(CH_2)_2C(CN)_2CH_2(CF_2)_5CF_2H$, $CF_3(CH_2)_2C(CN)_2(CH_2)_2C(CF_3)_2F$, $CF_3(CH_2)_2C(CN)_2(CH_2)_2(CF_2)_3CF_3$, $CF_2H(CF_2)_3CH_2C(CN)_2CH_2(CF_2)_3CF_2H$, $CF_3(CH_2)_2C(CN)_2CH_2(CF_2)_3CF_3$, $CF_3(CF_2)_2CH_2C(CN)_2CH_2(CF_2)_3CF_2H$, $CF_3CF_2CH_2C(CN)_2CH_2(CF_2)_3CF_2H$, 2-(2,2,3,3,4,4,5,5-octafluoropentyl)-2-(3,3,4,4,4-pentafluorobutyl) malononitrile and $CF_2HCF_2CF_2CF_2CH_2C(CN)_2$ $CH_2CH_2CF_2CF_3$;

pyrimidinyl alkynyl ethers of the formula $I^{-3}$ or thiadiazolyl alkynyl ethers of the formula $I^{-4}$:

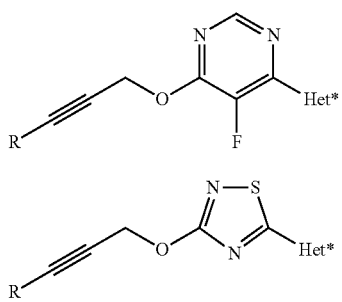

in which R is methyl or ethyl and Het* is 3,3-dimethylpyrrolidin-1-yl, 3-methylpiperidin-1-yl, 3,5-dimethylpiperidin-1-yl, 4-methylpiperidin-1-yl, hexahydroazepin-1-yl, 2,6-dimethylhexahydroazepin-1-yl or 2,6-dimethylmorpholin-4-yl (as described, for example, in JP 2006 131529).

Fungicides include, for example, strobilurins
  e.g., azoxystrobin, dimoxystrobin, enestroburin, fluoxastrobin, kresoxim-methyl, metominostrobin, picoxystrobin, pyraclostrobin, trifloxystrobin, orysastrobin, methyl (2-chloro-5-[1-(3-methylbenzyloxyimino)ethyl]benzyl)carbamate, methyl (2-chloro-5-[1-(6-methylpyridin-2-ylmethoxyimino)ethyl]benzyl)carbamate, methyl 2-(ortho-(2,5-dimethylphenyloxymethyl)phenyl)-3-methoxyacrylate;

carboxamides
  carboxanilides, such as benalaxyl, benodanil, bixafen, fluopyram, isopyrazam, sedaxane, boscalid, carboxin, mepronil, fenfuram, fenhexamid, flutolanil, furametpyr, metalaxyl, ofurace, oxadixyl, oxycarboxin, penthiopyrad, thifluzamide, tiadinil, N-(4'-bromobiphenyl-2-yl)-4-difluoromethyl-2-methylthiazole-5-carboxamide, N-(4'-(trifluoromethyl)biphenyl-2-yl)-4-difluoromethyl-2-methylthiazole-5-carboxamide, N-(4'-chloro-3'-fluorobiphenyl-2-yl)-4-difluoromethyl-2-methylthiazole-5-carboxamide, N-(3',4'-dichloro-4-fluorobiphenyl-2-yl)-3-difluoromethyl-1-methylpyrazole-4-carboxamide, N-(3',4'-dichloro-5-fluorobiphenyl-2-yl)-3-difluoromethyl-1-methylpyrazole-4-carboxamide, N-(2-cyanophenyl)-3,4-dichloroisothiazole-5-carboxamide; N-(3',4',5'-trifluorobiphenyl-2-yl)-3-difluoromethyl-1-methyl-1H-pyrazole-4-carboxamide, N-[2-(4'-trifluoromethylthio)biphenyl]-3-difluoromethyl-1-methyl-1H-pyrazole-4-carboxamide, N-[2-(1,3-dimethylbutyl)phenyl]-1,3-dimethyl-5-fluoro-1H-pyrazole-4-carboxamide, N-(2-bicyclopropyl-2-ylphenyl)-3-difluoromethyl-1-methyl-1H-pyrazole-4-carboxamide, N-(cis-2-bicyclopropyl-2-ylphenyl)-3-difluoromethyl-1-methyl-1H-pyrazole-4-carboxamide, N-(trans-2-bicyclopropyl-2-ylphenyl)-3-difluoromethyl-1-methyl-1H-pyrazole-4-carboxamide, N-[1,2,3,4-tetrahydro-9-(1-methylethyl)-1,4-methanonaphthalin-5-yl]-3-difluoromethyl-1-methyl-1H-pyrazole-4-carboxamide;
  carboxylic acid morpholides, such as dimethomorph, flumorph;
  benzamides, such as flumetover, fluopicolide (picobenzamid), zoxamide;
  other carboxamides, such as carpropamid, diclocymet, mandipropamid, ethaboxam, penthiopyrad, N-(2-(4-[3-(4-chlorophenyl)prop-2-ynyloxy]-3-methoxyphenyl)ethyl)-2-methylsulfonylamino-3-methylbutyramide, N-(2-(4-[3-(4-chlorophenyl)prop-2-ynyloxy]-3-methoxyphenyl)ethyl)-2-ethylsulfonylamino-3-methylbutyramide;

azoles (DMI)
  triazoles, such as bitertanol, bromuconazole, cyproconazole, difenoconazole, diniconazole, enilconazole, epoxiconazole, fenbuconazole, flusilazole, fluquinconazole, flutriafol, hexaconazole, imibenconazole, ipconazole, metconazole, myclobutanil, penconazole, propiconazole, prothioconazole, simeconazole, tebuconazole, tetraconazole, triadimenol, triadimefon, triticonazole;
  imidazoles, such as cyazofamid, imazalil, pefurazoate, prochloraz, triflumizole;
  benzimidazoles, such as benomyl, carbendazim, fuberidazole, thiabendazole; and others, such as ethaboxam, etridiazole, hymexazole;

nitrogen-comprising heterocyclyl compounds, e.g.,
  pyridines, such as fluazinam, pyrifenox, 3-[5-(4-chlorophenyl)-2,3-dimethylisoxazolidin-3-yl]pyridine;
  pyrimidines, such as bupirimate, cyprodinil, ferimzone, fenarimol, mepanipyrim, nuarimol, pyrimethanil;
  piperazines, such as triforine;
  pyrroles, such as fludioxonil, fenpiclonil;
  morpholines, such as aldimorph, dodemorph, fenpropimorph, tridemorph;
  dicarboximides, such as iprodione, procymidone, vinclozolin;
  others, such as acibenzolar-S-methyl, anilazine, captan, captafol, dazomet, diclomezine, fenoxanil, folpet, fenpropidin, famoxadone, fenamidone, octhilinone, probenazole, proquinazid, pyroquilon, quinoxyfen, tricyclazole, 6-aryl-[1,2,4]triazolo[1,5-a]pyrimidines, e.g. 5-chloro-7-(4-methylpiperidin-1-yl)-6-(2,4,6-trifluorophenyl)-[1,2,4]triazolo[1,5-a]pyrimidine, 2-butoxy-6-iodo-3-propylchromen-4-one, N,N-dimethyl-3-(3-bromo-6-fluoro-2-methylindole-1-sulfonyl)-[1,2,4]triazole-1-sulfonamide;

carbamates and dithiocarbamates
  dithiocarbamates, such as ferbam, mancozeb, maneb, metiram, metam, propineb, thiram, zineb, ziram;
  carbamates, such as diethofencarb, flubenthiavalicarb, iprovalicarb, propamocarb, methyl 3-(4-chlorophenyl)-3-(2-isopropoxycarbonylamino-3-methylbutyrylamino)propionate, 4-fluorophenyl N-(1-(1-(4-cyanophenyl)ethylsulfonyl)but-2-yl)carbamate;

other fungicides
  guanidines, such as dodine, iminoctadine, guazatine;
  antibiotics, such as kasugamycin, polyoxins, streptomycin, validamycin A;
  organometallic compounds, such as fentin salts;
  sulfur-comprising heterocyclyl compounds, such as isoprothiolane, dithianon;
  organophosphorus compounds, such as edifenphos, fosetyl, fosetyl-aluminum, iprobenfos, pyrazophos, tolclofos-methyl, phosphorous acid and its salts;
  organochlorine compounds, such as thiophanate-methyl, chlorothalonil, dichlofluanid, tolylfluanid, flusulfamide, phthalide, hexachlorobenzene, pencycuron, quintozene;

nitrophenyl derivatives, such as binapacryl, dinocap, dinobuton;

others, such as spiroxamine, cyflufenamid, cymoxanil, metrafenon, isopyrazam and sedaxane.

More preference is given to mixtures of fipronil with one or more active ingredients from the group consisting of acetamiprid, allethrin, alpha-cypermethrin, beta-cyfluthrin, bifenthrin, bioallethrin, 4-chloro-2-(2-chloro-2methylpropyl)-5-[(6-iodo-3-pyridinyl)-methoxy]-3(2H)-pyridazinone (CAS-RN: 120955-77-3), chlorfenapyr, chlorpyrifos, clothianidin, cyfluthrin, cyhalothrin, cypermethrin, deltamethrin, etofenprox, fenoxycarb, flufenoxuron, hydramethylnon, imidacloprid, nitenpyram, permethrin, pyriproxifen, silafluofen, tebufenozide, thiacloprid, thiamethoxam, tralomethrin, chlorantraniliprole and cyantraniliprole.

More preferred mixtures are mixtures of fipronil with one or more active ingredients from the group consisting of alpha-cypermethrin, bifenthrin, chlorfenapyr, cyfluthrin, cypermethrin, deltamethrin, etofenprox, hydramethylnon, imidacloprid, permethrin, thiacloprid, thiamethoxam chlorantraniliprole and cyantraniliprole.

More preferred mixtures are mixtures of fipronil with one or more active ingredients from the group consisting of alpha-cypermethrin, chlorfenapyr, hydramethylnon chlorantraniliprole and cyantraniliprole.

Preference is also given to a mixture of fipronil and metaflumizone.

Especially preferably, the polymer particle comprises, as insecticide component, only fipronil.

Preference is given to using a (1) sparingly soluble insecticidally active ingredient.

Preference is furthermore given to using two or more, particularly preferably two or three, sparingly soluble insecticidally active ingredients, especially mixtures of the insecticides mentioned.

Preference is given to using fipronil in a mixture with one or more pyrethroids, especially alpha-cypermethrin and/or deltamethrin, metaflumizone or borates.

The polymer particles used in accordance with the invention can be obtained by incorporating the insecticide(s) into the polymers P1 to P4. Methods suitable for this purpose are known to the person skilled in the art.

In the context of the invention, the term insecticide is used for individual insecticides from the group consisting of fipronil, allethrin, alpha-cypermethrin, beta-cyfluthrin, bifenthrin, bioallethrin, 4-chloro-2-(2-chloro-2-methylpropyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin, for mixtures of these insecticides with one another and for mixtures of these insecticides with one or more of the other sparingly soluble insecticides mentioned above.

In one further particular embodiment, the invention relates to polymer particles comprising i) at least one insecticide selected from the group consisting of fipronil, allethrin, alpha-cypermethrin, beta-cyfluthrin, bifenthrin, bioallethrin, 4-chloro-2-(2-chloro-2-methyl-propyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin and ii) a polymer P1.

In a further particular embodiment, the invention relates to polymer particles comprising i) at least one insecticide selected from the group consisting of fipronil, allethrin, alpha-cypermethrin, beta-cyfluthrin, bifenthrin, bioallethrin, 4-chloro-2-(2-chloro-2-methyl-propyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin and ii) a polymer P2.

In a further particular embodiment, the invention relates to polymer particles comprising i) at least one insecticide selected from the group consisting of fipronil, allethrin, alpha-cypermethrin, beta-cyfluthrin, bifenthrin, bioallethrin, 4-chloro-2-(2-chloro-2-methyl-propyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin and ii) a polymer P3.

In a further particular embodiment, the invention relates to polymer particles comprising i) at least one insecticide selected from the group consisting of fipronil, allethrin, alpha-cypermethrin, beta-cyfluthrin, bifenthrin, bioallethrin, 4-chloro-2-(2-chloro-2-methyl-propyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin and ii) a polymer P4.

According to the invention, the insecticide is comprised in the polymer particle. In the context of the invention, a polymer particle is understood as meaning an essentially spherical water-insoluble (solubility in water <1%) particle of a size in the range of generally 20 nm-10 µm, preferably 20 nm-5 µm, particularly preferably 20 nm-1 µm ($D_{50}$ values) which is stabilized by systems known to the person skilled in the art (for example of a surfactant or protective colloid type).

In an embodiment AI, the insecticide is distributed evenly over the polymer particle; i.e. the insecticide concentration over the entire cross section of the polymer particle is the same, and no concentration gradients can be found. This means in the context of the present invention that the insecticide concentrations in the center and in the outer region of the polymer particle differ by less than 50%, preferably less than 36%, especially less than 26%.

Polymer particles having the insecticide distribution described above are also referred to as matrix particles.

Polymer particles according to embodiment (AI) can be obtained, for example, by polymerization of the monomers mentioned under P1 and P2. The polymer particles can be prepared by free-radical, anionic or cationic polymerization in the absence of a solvent, in a solution, in a dispersion or in an emulsion in the presence of the insecticide. Preference is given to free-radical polymerization. Particular preference is given to aqueous free-radical emulsion polymerization and aqueous free-radical mini-emulsion polymerization in the presence of the insecticide. These polymerization methods are described, for example, in WO 2007/104713, U.S. Pat. No. 3,400,093, WO 2008/071649 and WO 99/40123. WO 99/40123 describes a process for preparing colorant-comprising polymer particles. The methods described therein can be applied to the preparation of the polymer particles according to the invention, with the colorant being replaced by the insecticide.

In a preferred embodiment, the insecticide is fed into the polymerization reaction dissolved in a monomer or a monomer mixture. It is also possible to add one or more further solvents to the monomer or monomer mixture.

It is possible to use customary auxiliaries such as emulsifiers and initiators in the polymerization.

It is also possible to prepare the polymer particles first and then to treat them with the insecticide. However, this is not preferred.

The insecticide is generally employed in amounts of 1 to 80% by weight, preferably 5 to 70% by weight and especially preferably 10 to 65% by weight, in each case based on the total weight of the polymer particle.

In the preferred case that the polymer particles are prepared by free-radical aqueous emulsion polymerization or by free-radical aqueous mini-emulsion polymerization in the presence of the insecticide, the polymer particles are obtained as aqueous polymer dispersions.

In this case, the polymer particles of embodiment AI have a particle size ($D_{50}$) of less than 1000 nm, preferably less than 500 nm, especially preferably in the range from 20 to 300 nm. Such polymer dispersions are essentially sedimentation-stable. In addition, the polymer dispersions are distinguished by a low migration tendency of the insecticide present in the polymer particle.

In a further preferred embodiment AI, the polymer particles have a particle size (D50) in the range of 30-90 nm.

The polymer particles obtained according to embodiment AI can be employed directly as an aqueous polymer dispersion or be subjected to a further work-up step. The polymer particles can be isolated, for example, by filtration, centrifugation, spray- or freeze-drying. Spray-drying is described, for example, in WO-A 99/24525.

Preferably, the polymer particles are employed directly as aqueous dispersion.

Polymer particles which can be obtained by polymerization of 30-80% by weight, based on P1, of component M1.1,
20-60% by weight, based on P1, of component M1.2 and
5-60% by weight, based on P1, of component M1.3
are particularly preferred.

Particular preference is given to polymer particles AI which can be obtained from the monomers M I, M II and M III listed for P1.

Particularly preferred polymer particles are those mentioned above, which can be obtained by mini-emulsion polymerization.

In a further embodiment AII, the insecticide is not evenly distributed over the polymer particle. In this embodiment, the bulk of the insecticide is located in the interior of the polymer particle, i.e. the insecticide concentration in the interior of the polymer particle is higher than in the outer region of the polymer particle.

In this embodiment (AII), the insecticide is present in the polymer particle in microencapsulated form, i.e. the insecticide forms the core material of the polymer particle and the polymer forms the capsule material of the polymer particle. Thus, a so-called core-shell morphology is present. The active ingredient concentration is therefore highest in the geometrical middle of the polymer particle and decreases toward the edge of the polymer particle. Such polymer particles are also referred to as core-shell microcapsules.

In addition to the insecticide, the core of the polymer particle may optionally comprise further lipophilic substances.

The polymer particles according to embodiment AII can be obtained, for example, by polymerization of the monomers mentioned under P1 and P2, by polycondensation of the monomers mentioned under P3 or by polyaddition of the monomers mentioned under P4 in the presence of an insecticide. These polymerization methods for preparing core-shell microcapsules are known to the person skilled in the art. They are described, for example, in DE-A 10 139 171, EP-A 457 154, EP-A 0 026 914 B1, WO 2006/092439, WO 99/24525 and EP 1 321 182 B1.

The polymer particles based on P1 or P2 can be obtained, for example, by free-radical aqueous emulsion, suspension or mini-emulsion polymerization. Suitable for preparing polymer particles based on polymers P3 or P4 is, for example, interfacial polymerization.

In the interfacial polymerization, as is known to the person skilled in the art, the insecticide and, in the case of P4, one or more isocyanates from the group M XIII and optionally further lipophilic substances such as organic solvents are dispersed as oil phase in water. In the case of P4, the amino component, in the case of P3, the prepolymer component is polymerized from the aqueous phase at the interface, for example by increasing the temperature.

Suitable lipophilic substances are compounds with only limited solubility in water. The solubility of the lipophilic substances in water is preferably less than 5% by weight, at 20° C. and 1013 mbar. Suitable lipophilic substances are, for example:

aliphatic hydrocarbon compounds, such as saturated or unsaturated $C_{10}$-$C_{40}$-hydrocarbons, which are branched or preferably linear, such as n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane and cyclic hydrocarbons, such as cyclohexane, cyclooctane, cyclodecane aromatic hydrocarbon compounds, such as benzene, naphthalene, biphenyl, o- or n-terphenyl, $C_1$-$C_{40}$-alkyl-substituted aromatic hydrocarbons, such as dodecylbenzene, tetradecylbenzene, hexadecylbenzene, hexylnaphthalene or decylnaphthalene saturated or unsaturated $C_6$-$C_{30}$-fatty acids, such as lauric, stearic, oleic or behenic acid, preferably eutectic mixtures of decanoic acid with myristic, palmitic or lauric acid fatty alcohols, such as lauryl, stearyl, oleyl, myristyl, cetyl alcohol, mixtures such as coconut fatty alcohol, and the so-called oxo alcohols which are obtained by hydroformylation of alpha-olefins and further reactions $C_6$-$C_{30}$-fatty amines and $C_6$-$C_{30}$-fatty amides, such as decylamine, decylamide, dodecylamine, dodecylamide, tetradecylamine, tetradecylamide or hexadecylamine or hexadecylamide, and also their mixtures esters such as $C_1$-$C_{10}$-alkyl esters of fatty acids, such as propyl palmitate, methyl stearate or methyl palmitate, and preferably their eutectic mixtures or methyl cinnamate natural and synthetic waxes, such as montan acid waxes, montan ester waxes, carnauba wax, polyethylene wax, oxidized waxes, polyvinyl ether wax, ethylene vinyl acetate wax or hard waxes obtainable by the Fischer-Tropsch process halogenated hydrocarbons, such as chloroparaffin, bromooctadecane, bromopentadecane, bromononadecane, bromoeicosane, bromodocosane.

Further suitable lipophilic substances are mixtures of these substances.

After the end of the polymerization, the core-shell microcapsules are dispersed in water. This dispersion can either be processed further as such, or the microcapsules can be separated from the aqueous phase and spray-dried, as described, e.g., in WO-A-99/24 525.

Preferably, the dispersion is processed further as such.

The core-shell microcapsules according to the invention preferably have a mean particle size ($D_{50}$ value) in the range of 0.5-10 μm and have an insecticide content, based on the total weight of the polymer particle, in the range of 5 to 80% by weight, preferably 5 to 70% by weight and especially preferably 10 to 65% by weight.

The invention also provides an insecticide formulation comprising a) polymer particles comprising a sparingly soluble insecticide from the group consisting of fipronil, allethrin, alpha-cypermethrin, beta-cyfluthrin, bifenthrin, bioallethrin, 4-chloro-2-(2-chloro-2-methylpropyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and at least one polymer from the group of the polymers P1 to P4, b) optionally adjuvants and c) optionally further formulation auxiliaries.

The invention furthermore provides an insecticide formulation comprising a1) polymer particles comprising a sparingly soluble insecticide from the group consisting of fipronil, allethrin, alpha-cypermethrin, beta-cyfluthrin, bifenthrin, bioallethrin, 4-chloro-2-(2-chloro-2-methylpropyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin and a polymer P1 b1) optionally adjuvants and c1) optionally further formulation auxiliaries.

The invention furthermore provides an insecticide formulation comprising a2) polymer particles comprising a sparingly soluble insecticide from the group consisting of fipronil, allethrin, alpha-cypermethrin, beta-cyfluthrin, bifenthrin, bioallethrin, 4-chloro-2-(2-chloro-2-methylpropyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin and a polymer P2 b2) optionally adjuvants and c2) optionally further formulation auxiliaries.

The invention furthermore provides an insecticide formulation comprising a3) polymer particles comprising a sparingly soluble insecticide from the group consisting of fipronil, allethrin, alpha-cypermethrin, beta-cyfluthrin, bifenthrin, bioallethrin, 4-chloro-2-(2-chloro-2-methylpropyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin and a polymer P3 b3) optionally adjuvants and c3) optionally further formulation auxiliaries.

The invention furthermore provides an insecticide formulation comprising a4) polymer particles comprising a sparingly soluble insecticide from the group consisting of fipronil, allethrin, alpha-cypermethrin, beta-cyfluthrin, bifenthrin, bioallethrin, 4-chloro-2-(2-chloro-2-methylpropyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin and a polymer P4 b4) optionally adjuvants and c4) optionally further formulation auxiliaries.

In one embodiment of the invention, the insecticide formulation comprises, in addition to the insecticide-comprising polymer particles, as adjuvants (b, b1-b4) one or more compounds from the groups of adjuvants described in WO 03/053345, that is one or more compounds from the groups Z1 tristyrylalkyl ether sulfates or phosphates, such as 2,4,6-tris[1-(phenyl)ethyl]phenyl-omega-hydroxy-poly(oxyethylene)sulfate, which are available, for example, as Soprophor® 4D-384, Soprophor® 30-33, Soprophor® BSU and Soprophor® 796IP from Rhodia;

Z2 nonionic surfactants based on perfluoroalkyl ethoxylate (for example obtainable as Fluowet® OTV from Clariant);

Z3 a mixture of 83% highly refined petroleum oil based on paraffin and 17% alkylarylpolyoxyethylene glycols (obtainable as Drexel Activate Oil from Drexel Chemical Company);

Z4 polyethers or organomodified tri- and polysiloxanes, such as modified polysiloxane polyethers, for example obtainable as Break Thru® S240 from Evonik or Silwet L-77 from Momentive;

Z5 a nonionic surfactant mixture of alkyloxypolyethyleneoxyethanols of the formula $CH_3CH[(CH_2)_nCH_3][O(C_2H_4O)_mH]$ where n=9-15 and m=3-40 (obtainable as SM-9® from Safe Materials, Inc.)

Z6 a silicone surfactant mixture of 100% 2-(3-hydoxypropyl)heptamethyltrisiloxane, ethoxylated acetate, allyloxypolyethylene glycol monoallylacetate and polyethylene glycol diacetate (obtainable as Sylgard® 309 from Wilber-Ellis-Company);

Z7 a biodegradable, low-foaming nonionic surfactant comprising primary alkyl polyoxyethylene ethers, free fatty acids and adjuvants (obtainable as Aktivator 90® from Laveland Industries, Inc.);

Z8 a nonionic surfactant mixture of fatty acid and alcohol ethoxylates based on soybeans (obtainable as Preference® NIS from Cenex/Lan O'Lakes Agronomy Company);

Z9 an anionic surfactant mixture comprising 58% ammonium n-alcohol ether sulfate (obtainable as Rhodapex® CO-436 from Rhodia);

Z10 an anionic surfactant mixture comprising 58% ammonium nonylphenol ether sulfate (obtainable as Rhodapex® CE-128 from Rhodia);

Z11 a mixture of polyalkylene oxide-modified polydimethylsiloxane and nonionic surfactants (obtainable as Thoroughbred® from Estes Inc.) and Z12 a nonionic detergent composed of 100% polyoxyethylene (10)-isooctyl cyclohexyl ether (obtainable as Triton® x-100 from Aldrich Chemical Company).

Additionally preferred as adjuvants (b, b1-b4) are compounds from group Z13:

Z13 alkoxylated fatty alcohols and/or fatty acids, which may additionally each be etherified, sulfonated or phosphonated, for example obtainable as Genapol® XM 100 or Genapol® 060 from Clariant, or as Alkamul® B or Alkamul® A from Rhodia.

Preference is given to adjuvants of groups Z1, Z4 and Z13, in particular Z1 and Z4.

In one embodiment of the invention, one or more adjuvants of groups Z1 to Z14 are used. In a further embodiment of the invention, no adjuvants of groups Z1-Z13, preferably of groups Z1 to Z12, are used.

If adjuvants of groups Z1-Z13 are used, they can be added to the concentrate or else only to the application liquor.

The amount of adjuvants Z1-Z13—if used—is preferably at least 0.5-50 times [g], preferably 1-20 times [g] and particularly preferably 1-5 times [g] the amount of the insecticide(s) [g].

As well as polymer particles (a, a1-a4) and, if appropriate, adjuvants (b, b1-b4), the insecticide formulations (i.e. the insecticide formulations and the aqueous application forms obtainable by dilution) may comprise, as components (c, c1-c4), customary formulation auxiliaries in the amounts customary therefor.

These include, for example, rheology modifiers (thickeners), antifoams, bactericides, antifreezes, pH controllers, stabilizers and plasticizers.

Suitable thickeners are compounds which impart pseudoplastic flow behavior to aqueous compositions, i.e. high viscosity at rest and low viscosity in the agitated state. Examples here include polysaccharides such as xanthan (Kelzan® from Kelco; Rhodopol® 23 from Rhone Poulenc; or Veegum® from R. T. Vanderbilt), and inorganic layer minerals such as Attaclay® (from Engelhardt) or Van Gel B (from R. T. Vanderbilt).

Suitable stabilizers may be low molecular weight components, for example mono- and diglycerides, esters of the monoglycerides, alkylglucosides, lecithin, fatty acid derivatives of urea and urethanes.

Suitable plasticizers are sucrose, glucose, lactose, fructose, sorbitol, mannitol or glycerol.

Examples of antifoams suitable for the insecticide formulations according to the invention include silicone emulsions (for example Silicon® SRE, from Wacker, or Rhodorsil® from Rhodia), long-chain alcohols, fatty acids and mixtures thereof.

Bactericides can be added to the insecticide formulations according to the invention for stabilization against infestation with microorganisms. They are typically isothiazolone compounds, e.g. 1,2-benzisothiazolin-3-one, 5-chloro-2-methylisothiazol-3-one, 2-methylisothiazol-3-one or 2-octylisothiazol-3-one, which are available, for example, under the tradenames Proxel® from Arch Chemical Inc., Acticide® RS from Thor Chemie and Kathon® MK from Rohm & Haas.

Suitable antifreezes are organic polyols, e.g. ethylene glycol, propylene glycol or glycerol. These are used in aqueous formulations, typically in amounts of not more than 20% by weight, for example 1 to 20% by weight and in particular 2 to 10% by weight, based on the total weight of the aqueous insecticide formulation.

If appropriate, the insecticide formulations may comprise 0.1 to 5% by weight, based on the total amount of the formulation prepared, of pH regulators for regulating the pH of the formulation or of the diluted application form, the amount and type of the regulator used being guided by the chemical properties and the amount of the active ingredients and solubilizers. Examples of buffers are alkali metal salts of weak inorganic or organic acids, for example phosphoric acid, boric acid, acetic acid, propionic acid, citric acid, fumaric acid, tartaric acid, oxalic acid and succinic acid.

Conventional surfactants in customary amounts may be added to the aqueous insecticide formulation. Examples of conventional surfactants are the nonionic, anionic, cationic or zwitterionic emulsifiers, wetting agents or dispersants specified hereinafter, for example the nonionic substances of groups d1) to d16).

d1) aliphatic $C_8$-$C_{30}$-alcohols which may be alkoxylated, for example, with 1-60 alkylene oxide units, preferably 1-60 EO and/or 1-30 PO and/or 1-15 BO in any desired sequence. In this context, EO represents a repeat unit derived from ethylene oxide, PO one derived from propylene oxide, and BO one derived from butylene oxide. The terminal hydroxyl groups of these compounds may be end group-capped by an alkyl, cycloalkyl or acyl radical having 1-24 and in particular 1 to 4 carbon atoms. Examples of such compounds are: Genapol®C, L, O, T, UD, UDD, X products from Clariant, Plurafac® and Lutensol® A, AT, ON, TO, M products from BASF SE, Marlipal®24 and 013 products from Condea, Dehypon® products from Henkel, Ethylan® products from Akzo-Nobel such as Ethylan CD 120;

d2) copolymers consisting of EO, PO and/or BO units, in particular EO/PO block copolymers such as the Pluronic® products from BASF SE and the Synperonic® products from Uniqema with a molecular weight of 400 to $10^6$ daltons, and also alkyleneoxide adducts of $C_1$-$C_9$ alcohols such as Atlox®5000 from Uniqema or Hoe®-S3510 from Clariant;

d3) fatty acid and triglyceride alkoxylates such as the Serdox®NOG products from Condea, and alkoxylated vegetable oils such as soybean oil, rapeseed oil, corn kernel oil, sunflower oil, cottonseed oil, linseed oil, coconut oil, palm oil, safflower oil, walnut oil, peanut oil, olive oil or castor oil, in particular rapeseed oil, for example the Emulsogen® products from Clariant;

d4) fatty acid amidealkoxylates such as the Comperlan® products from Henkel or the Amam® products from Rhodia;

d5) alkylene oxide adducts of alkynediols such as the Surfynol® products from Air Products, sugar derivatives such as amino and amido sugars from Clariant, glucitols from Clariant, alkylpolyglycosides in the form of the APG® products from Henkel, or such as sorbitan esters in the form of the Span® or Tween® products from Uniqema, or cyclodextrin esters or ethers from Wacker;

d6) surface-active cellulose and algin, pectin and guar derivatives, such as the Tylose® products from Clariant, the Manutex® products from Kelco and guar derivatives from Cesalpina;

d7) polyol-based alkylene oxide adducts, such as Polyglykol® products from Clariant;

d8) interface-active polyglycerides and derivatives thereof from Clariant;

d9) sugar surfactants, for example alkoxylated sorbitan fatty acid esters, alkylpolyglycosides and the alkoxylated derivatives thereof;

d10) alkylene oxide adducts of fatty amines;

d11) surface-active compounds based on silicone or silane, such as the Tegopren® products from Goldschmidt and the SE® products from Wacker, and also the Bevaloid®, Rhodorsil® and Silcolapse® products from Rhodia (Dow Corning, Reliance, GE, Bayer);

d12) interface-active sulfonamides, for example from Lanxess;

d13) neutral surfactant polyvinyl compounds such as modified polyvinylpyrollidone, such as the Luviskol® products from BASF and the Agrimer® products from ISP, or the derivatized polyvinyl acetates such as the Mowilith® products from Clariant, or the butyrates such as the Lutonal® products from BASF, the Vinnapas® and the Pioloform® products from Wacker, or modified polyvinyl alcohols such as the Mowiol® products from Clariant, and surface-active derivatives of montan, polyethylene and polypropylene waxes such as the BASF Luwax® products or the Licowet® products from Clariant;

d14) poly- or perhalogenated phosphonates and phosphinates such as Fluowet®-PL from Clariant;

d15) poly- or perhalogenated neutral surfactants, for example Emulsogen®-1557 from Clariant;

d16) (poly)alkoxylated, in particular polyethoxylated, aromatic compounds such as (poly)alkoxylated phenols [=phenol (poly)alkylene glycol ethers], for example with 1 to 50 alkyleneoxy units in the (poly)alkyleneoxy moiety, where the alkylene moiety has preferably in each case 2 to 4 carbon atoms, preferably phenol reacted with 3 to 10 mol of alkylene oxide, (poly)alkylphenol alkoxylates [=polyalkylphenol (poly)alkylene glycol ethers], for example with 1 to 12 carbon atoms per alkyl radical and 1 to 150 alkyleneoxy units in the polyalkyleneoxy moiety, preferably tri-n-butylphenol or triisobutylphenol reacted with 1 to 50 mol of ethylene oxide, polyarylphenols or polyarylphenol alkoxylates [=polyarylphenol (poly)alkylene glycol ethers], for example tristyrylphenol polyalkylene glycol ether with 1 to 150 alkyleneoxy units in the polyalkyleneoxy moiety, preferably tristyrylphenol reacted with 1 to 50 mol of ethylene oxide and the condensation products thereof with formaldehyde— among these, preference is given to alkylphenol reacted with 4 to 10 mol of ethylene oxide, commercially available, for example, in the form of the Agrisol® products (Akcros), triisobutylphenol reacted with 4 to 50 mol of ethylene oxide, commercially available, for example, in the form of the Sapogenat® T products (Clariant), nonylphenol reacted with 4 to 50 mol of ethylene oxide, commercially available, for example, in the form of the Arkopal® products (Clariant), tristyrylphenol reacted with 4 to 150 mol of ethylene oxide, for example from the Soprophor® series such as Soprophor® FL or Soprophor® CY/8 (Rhodia);

the anionic substances of groups d17) to d23):

d17) anionic derivatives of the products described under d1) in the form of ether carboxylates, sulfonates, sulfates (=sulfuric monoesters) and phosphates (phosphoric mono- or diesters) of the substances described under d1) and the inorganis salts (e.g. $NH_4^+$, alkali metal and alkaline earth metal salts) and organic salts (e.g. based on amine or alkanolamine) thereof, such as Genapol®LRO, Sandopan® products, Hostaphat/Hordaphos® products from Clariant;

d18) anionic derivatives of the products described under d17) in the form of ether carboxylates, sulfonates, sulfates (=sulfuric monoesters) and phosphates (phosphoric mono- or diesters) of the substances described under d17), for example the acidic phosphoric ester of a $C_1$-$C_{16}$-alkylphenol ethoxylated with 2 to 10 mol of ethylene oxide, e.g. the acidic phosphoric ester of a nonylphenol reacted with 3 mol or with 9 mol of ethylene oxide, and the triethanolamine-neutralized phosphoric ester of the reaction product of 20 mol of ethylene oxide and 1 mol of tristyrylphenol;

d19) benzenesulfonates such as alkyl- or arylbenzenesulfonates, for example acidic (poly)alkyl- and (poly)arylbenzenesulfonates and those neutralized with suitable bases, for example having 1 to 12 carbon atoms per alkyl radical or having up to 3 styrene units in the polyaryl radical, preferably (linear) dodecylbenzenesulfonic acid and the oil-soluble salts thereof, for example the calcium salt or the isopropylammonium salt of dodecylbenzenesulfonic acid and acidic (linear) dodecylbenzenesulfonate, commercially available, for example, in the form of the Marlon® products (Sasol);

d20) lignosulfonates such as sodium, calcium or ammonium lignosulfonates, such as Ufoxane® 3A, Borrespese AM® 320 or Borrespese® NA;

d21) condensation products of arylsulfonic acids such as phenolsulfonic acid or naphthalenesulfonic acid with formaldehyde and optionally urea, in particular the salts thereof and especially the alkali metal salts and calcium salts, for example the Tamol® and Wettol® brands from BASF SE, such as Wettol® D1;

d22) salts of aliphatic, cycloaliphatic and olefinic carboxylic acids and polycarboxylic acids, and also alpha-sulfo fatty acid esters as obtainable from Henkel;

d23) alkanesulfonates, paraffin- and olefinsulfonates such as Netzer IS®, Hoe®S1728, Hostapur®OS, Hostapur®SAS from Clariant;

and additionally cationic and zwitterionic products of groups d24) and d25):

d24) quaternary ammonium compounds having 8 to 22 carbon atoms ($C_8$-$C_{22}$), for example the Genamin®C,L, O,T products from Clariant;

d25) surface-active zwitterionic compounds such as taurides, betaines and sulfobetaines in the form of Tegotain® products from Evonik, Hostapon®T and Arkopon®T products from Clariant.

Among the alkyleneoxy units, ethyleneoxy, propyleneoxy and butyleneoxy units, in particular ethyleneoxy units and mixtures of ethyleneoxy units and propyleneoxy units, are preferred. "Alkoxylated" means that the surface-active substance has a polyalkylene ether group, in particular a poly-$C_2$-$C_4$-alkylene ether group, especially a poly-$C_2$-$C_3$-alkylene ether group.

The invention furthermore provides a process for preparing the insecticide formulations according to the invention. Suitable for use as polymer particles are all polymer particles P1-P4 described above in embodiments AI and AII, and also all mixtures of these polymer particles.

In a preferred embodiment, polymer particles which can be obtained according to embodiment AI are employed. In a further preferred embodiment, polymer particles which can be obtained according to embodiment AII are employed.

To prepare the insecticide formulation, the polymer particles (P1-P4) can be employed as aqueous dispersion or as a solid. The polymer particles (P1-P4) are preferably employed as aqueous dispersion.

The insecticide formulation can be obtained by mixing at least one type of polymer particle selected from the polymer particles P1-P4 with, if appropriate, further adjuvants (b, b1-b4) and, if appropriate, further formulation auxiliaries (c, c1-c4). In addition, emulsifiers, wetting agents and dispersants may be added to the insecticide formulation. Here, the polymer particles (a, a1-a4) can be employed individually or as mixtures.

The invention furthermore provides the use of the insecticide formulations mentioned above for improving the soil mobility of sparingly soluble insecticides from the group consisting of fipronil, allethrin, alpha-cypermethrin, beta-cyfluthrin, bifenthrin, bioallethrin, 4-chloro-2-(2-chloro-2-methylpropyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin.

The insecticide formulations are usually diluted before use. Useful diluents are, in addition to water, oil fractions of moderate to high boiling point, such as kerosene or diesel oil, and also coal tar oils and oils of vegetable or animal origin, aliphatic, cyclic and aromatic hydrocarbons, for example toluene, xylene, paraffin, tetrahydronaphthalene, alkylated naphthalenes or derivatives thereof, methanol, ethanol, propanol, butanol, cyclohexanol, cyclohexanone, isophorone, strongly polar solvents, for example dimethyl sulfoxide or N-methylpyrrolidone. Preference is given to using water or an aqueous system. It is also possible only to add the solubilizer at the stage of the dilute formulation. In this embodiment, the inventive use is in the form of a tankmix.

An aqueous system is understood to mean pure water or water comprising a buffer system or salts or further additives, for example water-miscible solvents or mixtures thereof. The pH of the aqueous system is generally in the range from 2 to 13, preferably from 3 to 12, more preferably from 4 to 10.

If appropriate, the dilute compositions may comprise 0.1-5% by weight of buffer based on the total amount of the formulation produced for pH regulation, the amount and type of the buffer used being guided by the chemical properties of the insecticide. Examples of buffers are alkali metal salts of weak inorganic or organic acids, for example phosphoric acid, boric acid, acetic acid, propionic acid, citric acid, fumaric acid, tartaric acid, oxalic acid and succinic acid.

The diluted insecticide composition, preferably an aqueous application form, is typically applied by spraying or nebulizing. It is possible to add oils of various types, wetting agents, adjuvants, further active ingredients such as herbicides, bactericides or fungicides immediately before the tankmix application. These agents can be added to the inventive compositions in a weight ratio of 1:100 to 100:1, preferably 1:10 to 10:1. The insecticide concentration in the tankmix can vary within relatively wide ranges.

The insecticides formulations or tankmixes used in accordance with the invention and the aqueous application forms obtained therefrom show increased soil mobility of the sparingly soluble insecticides, in particular termiticides, used. They are therefore suitable for controlling soil-dwelling pests, for example in the protection of materials and buildings or plants. Particularly preferably, the formulations according to the invention are suitable for controlling termites, ants and nematodes, in particular for controlling termites.

Accordingly, the invention also provides a method for controlling soil-dwelling invertebrate pests, wherein an insecticide formulation comprising a) polymer particles comprising a sparingly soluble insecticide from the group consisting of fipronil, allethrin, alpha-cypermethrin, beta-cyfluthrin, bifenthrin, bioallethrin, 4-chloro-2-(2-chloro-2-methylpropyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin and at least one polymer from the group of the polymers P1 to P4, b) optionally adjuvants and c) optionally further formulation auxiliaries is applied to or into a soil.

In a preferred embodiment, the invention relates to a method for controlling soil-dwelling invertebrate pests wherein an insecticide formulation comprising a1) polymer particles comprising a sparingly soluble insecticide from the group consisting of fipronil, allethrin, alpha-cypermethrin, beta-cyfluthrin, bifenthrin, bioallethrin, 4-chloro-2-(2-chloro-2-methylpropyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin and a polymer P1 b1) optionally adjuvants and c1) optionally further formulation auxiliaries is applied to or into a soil.

In a further preferred embodiment, the invention relates to a method for controlling soil-dwelling invertebrate pests wherein an insecticide formulation comprising a2) polymer particles comprising a sparingly soluble insecticide from the group consisting of fipronil, allethrin, alpha-cypermethrin, beta-cyfluthrin, bifenthrin, bioallethrin, 4-chloro-2-(2-chloro-2-methylpropyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin and a polymer P2 b2) optionally adjuvants and c2) optionally further formulation auxiliaries is applied to or into a soil.

In a further preferred embodiment, the invention relates to a method for controlling soil-dwelling invertebrate pests wherein an insecticide formulation comprising a3) polymer particles comprising a sparingly soluble insecticide from the group consisting of fipronil, allethrin, alpha-cypermethrin, beta-cyfluthrin, bifenthrin, bioallethrin, 4-chloro-2-(2-chloro-2-methylpropyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin and a polymer P3 b3) optionally adjuvants and c3) optionally further formulation auxiliaries is applied to or into a soil.

In a further preferred embodiment, the invention relates to a method for controlling soil-dwelling invertebrate pests wherein an insecticide formulation comprising a4) polymer particles comprising a sparingly soluble insecticide from the group consisting of fipronil, allethrin, alpha-cypermethrin, beta-cyfluthrin, bifenthrin, bioallethrin, 4-chloro-2-(2-chloro-2-methylpropyl)-5-[(6-iodo-3-pyridinyl)methoxy]-3(2H)-pyridazinone (CAS-RN: 120955-77-3), chlorantraniliprole, chlorfenapyr, cyantraniliprole, cyfluthrin, cyhalothrin, cypermethrin, deltamethrin, etofenprox, fenoxycarb, flufenoxuron, hydramethylnon, imidacloprid, indoxacarb, metaflumizone, permethrin, pyriproxifen, tebufenozide and tralomethrin and a polymer P4 b4) optionally adjuvants and c4) optionally further formulation auxiliaries is applied to or into a soil.

In a preferred embodiment, the soil is the soil underneath a building or within a radius of 10 m around a building.

In the protection of buildings against termites, the legal requirements in some countries stipulate that the insecticide is applied in trenches of a certain width and depth. Customary are ditches having dimensions of 6×6 inches (15.24× 15.24 cm) as required, for example, in the USA.

By virtue of the inventive increased soil mobility of the insecticides it is possible to apply the insecticide in ditches of smaller dimensions or directly into the soil. If appropriate, one may also use more highly concentrated application solution to reduce the volume of water used. In a further particularly preferred embodiment of the method according to the invention, the method is carried out to protect buildings against termites, and the insecticide, in particular fipronil, is applied to the soil used by the termites in a ditch having a depth of <3 inches (7.62 cm), preferably in a ditch having a depth of 3 to 1 inches (7.62-2.54 cm). Preference is furthermore given to an application form where the concentration of the insecticide in the aqueous application form is at least 1000 ppm, preferably at least 1250 ppm.

The particle size of the microcapsule powder and the polymer particles was documented either with a Malvern Particle Sizer Typ 3600 E or by the quasielastic light scattering method (DIN-ISO 13321) using a High Performance Particle Sizer (HPPS) from Malvern Instruments Ltd. The D[v, 0.1] value implies that 10% of the particles have a particle size (according to the volume average) up to this value. Accordingly, D[v, 0.5] means that 50% of the particles ($D_{50}$ value) have a particle size (according to the volume average) of less than/equal to this value, and D[v, 0.9] means that 90% of the particles have a particle size (according to the volume average) of less than/equal to this value. The span value arises from the quotient of the difference D[v, 0.9]-D[v, 0.1] and D[v, 0.5].

The invention is illustrated in more detail by the examples below, without being limited thereto.

EXAMPLES

Example 1

Aqueous Phase 583.19 g of DI water (DI=fully deionized water)

5 g of Genapol X-060 (ethoxylated isotridecyl alcohol, from Clariant)

8.75 g of Rhodafac RS 610 (polyoxyethylene tridecyl ether phosphate, from Rhodia)

8.75 g of Witconol NS 500 K (alcohol polyglycol ether, from Akzo Nobel)

2.0 g of a 2.5% by weight strength aqueous solution of sodium nitrite

Oil Phase 20.00 g of 1,4-butanediol diacrylate (BASF)

20.00 g of methyl methacrylate (BASF)

315.00 g of Agnique KE 3658 (fatty acid dimethyl amide, from Cognis)

148.84 g of fipronil (90.7% pure, technical active ingredient)

10.00 g of methacrylic acid (BASF)

Feed 1

3.53 g of a 75% by weight strength solution of tert-butyl perpivalate in aliphatic hydrocarbons Feed 2

5.00 g of a 10% by weight strength aqueous solution of tert-butyl hydroperoxide

Feed 3

38.71 g of a 0.6% by weight strength aqueous solution of ascorbic acid a) The aqueous phase above was initially charged at room temperature. The oil phase was added and the mixture was dispersed with a high-speed dissolver stirrer at 5000 rpm. 30 minutes of dispersion gave a stable emulsion.

b) Following the introduction of feed 1, the reaction mixture was subjected to the following temperature program: heating to 60° C. over 60 minutes, continuous increase of the temperature from 60 to 70° C. over a period of 120 minutes, increase to 85° C. over a period of 30 minutes and maintaining of this temperature for 60 minutes. Feed 2 was then added, and feed 3 was introduced at 85° C. over a period of 60 minutes. The mixture was then cooled to room temperature.

This gave a dispersion having a solids content of 21.6% by weight and a mean particle size of (D50)=1.9 μm (z-average determined by means of light scattering).

The dispersion obtained was mixed with 1% Break-Thru S 240 (from Evonik).

Example 2

Aqueous Phase 972.58 g of DI water (DI=fully deionized water)

1.37 g of a 40.70% strength aqueous solution of LS200/0 (cross-linked n-butyl acrylate dispersion having a particle size D(50)=80 nm) (BASF)

0.43 g of sodium bicarbonate 0.34 g of potassium peroxodisulfate

Feed 1

66.29 g of DI water (DI=fully dionized water)

3.43 g of a 40.0% strength aqueous solution of Emulgator K 30 (Bayer; sodium alkylsulfonates)

Feed 2

100.00 g of n-butyl acrylate (BASF)

2.86 g of Laromer DCPA (hexahydro-4,7-methano-1H-indenacrylate, from BASF)

11.43 g of fipronil (90.2% pure, technical active ingredient)

a) The aqueous phase above was initially charged at room temperature and then heated to 65° C. Feeds 1 and 2 were metered in over a period of 3.5 hours. The mixture was then post-polymerized for 2 hours and then cooled to room temperature.

This gave a dispersion having a solids content of 9% by weight and a mean particle size of (D50)=430 nm (HPPS).

Example 3

Aqueous Phase
580.00 g of DI water (DI=fully deionized water)
16.00 g of a 15% strength aqueous solution of Disponil SDS G (sodium laurylsulfate, from Cognis)
Oil Phase
12.00 g of pentaerythritol tetraacrylate (Sigma-Aldrich)
228.00 g of methyl methacrylate
12.00 g of hexadecane (Alfa Aesar)
53.51 g of fipronil (89.70% pure, technical active ingredient)
Feed 1
2.40 g of sodium peroxodisulfate
117.50 g of DI water
Feed 2
7.50 g of pentaerythritol tetraacrylate
15.00 g of methyl methacrylate
7.50 g of 1,4-butanediol diacrylate (BASF)
7.50 g of methacrylic acid (BASF)
0.25 g of a 15% strength aqueous solution of Disponil SDS G (Cognis)
49.60 g of DI water
Feed 3
3.20 g of a 10% by weight strength aqueous solution of tert-butyl hydroperoxide
Feed 4
14.20 g of a 1.4% strength aqueous solution of L(+)-ascorbic acid
a) The oil phase was added to the aqueous phase, and the mixture was then sonicated in a UP400S ultrasonic bath from Hielscher operated at 100% power for 10 minutes.
b) 24% of the emulsion were heated to 80° C. 6% of feed 1 were added, and the mixture was initially polymerized for 5 minutes. The remaining 76% of the emulsion were metered in over a period of 60 minutes. Feed 1 was added over a period of 160 minutes, and once the metered addition had ended, feed 2 was introduced into the emulsion over a period of 90 minutes. The mixture was post-polymerized for 60 minutes, and feed 3 was then added, followed by the metered addition of feed 4 over a period of 60 minutes. The mixture was subsequently cooled to room temperature.

This gave a dispersion having a solids content of 28.6% by weight and a mean particle size of (D50)=181 nm (HPPS).

Example 4

Aqueous Phase
314.49 g of DI water (DI=fully deionized water)
19.26 g of a 15% strength aqueous solution of Disponil SDS G
Oil Phase
8.88 g of 1,4-butanediol diacrylate
288.00 g of methyl methacrylate
14.24 g of hexadecane
63.41 g of fipronil (89.7% pure, aqueous)
8.88 g of methacrylic acid
23.12 g of pentaerythritol tetraacrylate
Feed 1
142.10 g of a 2.00% by weight strength solution of sodium peroxodisulfate in DI water
Feed 2
3.79 g of a 10% by weight strength aqueous solution of tert-butyl hydroperoxide
Feed 3
16.83 g of a 1.4% by weight strength aqueous solution of ascorbic acid a) The oil phase was added to the aqueous phase, and the mixture was then sonicated in a UP400S ultrasonic bath from Hielscher operated at 100% power for 10 minutes.
b) 24% of the emulsion were heated to 80° C. 6% of feed 1 were added, and the mixture was initially polymerized for 5 minutes. The remaining 76% of the emulsion were metered in over a period of 60 minutes. Feed 1 was added over a period of 160 minutes, the mixture was post-polymerized for 60 minutes, and feed 2 was then added, followed by the metered addition of feed 3 over a period of 60 minutes. The mixture was subsequently cooled to room temperature.

This gave a dispersion having a solids content of 42% by weight and a mean particle size of (D50)=180 nm (HPPS).

Example 5

Aqueous Phase
466.51 g of DI water (DI=fully deionized water)
12.04 g of a 15% strength aqueous solution of Disponil SDS G
Oil Phase
5.55 g of 1,4-butanediol diacrylate
180.00 g of methyl methacrylate
8.90 g of hexadecane
39.64 g of fipronil (89.7% pure, aqueous)
5.55 g of methacrylic acid
14.45 g of pentaerythritol tetraacrylate
Feed 1
88.81 g of a 2.0% by weight strength solution of sodium peroxodisulfate in DI water
Feed 2
2.37 g of a 10% by weight strength aqueous solution of tert-butyl hydroperoxide
Feed 3
10.52 g of a 1.4% by weight strength aqueous solution of ascorbic acid a) The oil phase was added to the aqueous phase, and the mixture was then sonicated in an ultrasonic bath operated at 100% power for 10 minutes.
b) 24% of the emulsion were heated to 80° C. 6% of feed 1 were added, and the mixture was initially polymerized for 5 minutes. The remaining 76% of the emulsion were metered in over a period of 60 minutes. Feed 1 was added over a period of 160 minutes, the mixture was post-polymerized for 60 minutes, and feed 2 was then added, followed by the metered addition of feed 3 over a period of 60 minutes. The mixture was subsequently cooled to room temperature.

This gave a dispersion having a solids content of 28% by weight and a mean particle size of (D50)=190 nm (HPPS).

Example 6

Aqueous Phase
223.46 g of DI water (DI=fully deionized water)
1.33 g of a 15% strength aqueous solution of Disponil SDS G
Oil Phase
10.00 g of pentaerythritol tetraacrylate
Feed 1
223.46 g of DI water
4.00 g of a 15% strength aqueous solution of Disponil SDS G
200.00 g of methyl methacrylate
10.00 g of hexadecane
48.51 g of fipronil (89.70% pure, technical active ingredient)

Feed 2
2.00 g of sodium peroxodisulfate
98.00 g of DI water a) The oil phase was pre-emulsified in the aqueous phase for 30 minutes. The emulsion was cooled and sonicated using a Branson Sonifier 450 ultrasound processor at 100% power for 10 minutes.

b) With stirring, the initial charge was heated to 80° C. and emulsified with pentaerythritol tetraacrylate. 55.19 g of feed 1 and 6.00 g of feed 2 were added, and the mixture was stirred for 2 minutes. The remainder of feed 1 was metered in over a period of 60 minutes, and the mixture was post-polymerized for 30 minutes. The remainder of feed 2 was then metered in over a period of 120 minutes and the mixture was stirred for another 60 minutes. The mixture was then cooled to room temperature.

This gave a dispersion having a solids content of 27.1% by weight and a mean particle size of (D50)=200 nm (HPPS).

Example 7

Aqueous Phase
70.00 g of DI water (DI=fully deionized water)
2.33 g of a 15% strength aqueous solution of Disponil SDS G
Oil Phase
17.50 g of pentaerythritol tetraacrylate
Feed 1
424.83 g of DI water
7.00 g of a 15% strength aqueous solution of Disponil SDS G (sodium laurylsulfate, from Cognis)
350.00 g of methyl methacrylate
17.50 g of hexadecane
84.89 g of fipronil (89.70% pure, technical active ingredient)
Feed 2
3.50 g of sodium peroxodisulfate
55.00 g of DI water a) The oil phase was pre-emulsified in the aqueous phase for 30 minutes. The emulsion was cooled and sonicated using a Branson Sonifier 450 ultrasound processor at 100% power for 10 minutes.

b) With stirring, the initial charge was heated to 80° C. and emulsified with pentaerythritol tetraacrylate. 88.42 g of feed 1 and 3.51 g of feed 2 were added, and the mixture was stirred for 2 minutes. The remainder of feed 1 was metered in over a period of 60 minutes, and the mixture was post-polymerized for 30 minutes. The remainder of feed 2 was then metered in over a period of 120 minutes and the mixture was stirred for another 60 minutes. The mixture was then cooled to room temperature.

This gave a dispersion having a solids content of 42.4% by weight and a mean particle size of (D50)=200 nm (HPPS).

Example 8

Oil Phase
377.78 g of isobutanol (BASF)
Feed 1
44.44 g of acrylic acid (BASF)
411.11 g of methyl methacrylate
89.19 g of fipronil (90.66% pure, aqueous, technical active ingredient)
Feed 2
3.49 g of tert-butyl peroctoate
56.51 g of isobutanol
Feed 3
45.71 g of ammonia (25% strength) (BASF)

a) The oil phase and 444.60 g of feed 1 were combined and heated to 105° C. 22.22 g of feed 2 were introduced over a period of 15 minutes, and the mixture was then stirred for another 30 minutes. The remainder of feeds 1 and 2 was then metered in over a period of 60 minutes, and the mixture was post-polymerized for 60 minutes. The reaction was cooled to 70° C. over a period of 30 minutes, and feed 3 was then introduced over a period of 10 minutes. The mixture was then stirred for another 15 minutes and subsequently cooled to room temperature.

This gave a dispersion having a solids content of 23.9% by weight and a mean particle size of (D50)=167 nm (HPPS).

Example 9

Aqueous Phase
208.07 g of DI water (DI=fully deionized water)
104.00 g of a 10% strength aqueous solution of Mowiol 18-88 (Kuraray)
1.04 g of a 2.5% by weight strength aqueous solution of sodium nitrite
Oil Phase
10.40 g of 1,4-butanediol diacrylate
10.40 g of methyl methacrylate
163.80 g of Genagen 4296 (Clariant)
77.40 g of fipronil (90.7% pure, aqueous, technical active ingredient)
5.20 g of methacrylic acid
Feed 1
1.84 g of a 75% by weight strength solution of tert-butyl perpivalate in aliphatic hydrocarbons
Feed 2
2.60 g of a 10% by weight strength aqueous solution of tert-butyl hydroperoxide
Feed 3
38.71 g of a 0.65% by weight strength aqueous solution of ascorbic acid a) The aqueous phase above was initially charged at room temperature. The oil phase was added and the mixture was dispersed with a high-speed dissolver stirrer at 5000 rpm. 30 minutes of dispersion gave a stable emulsion.

b) Following the introduction of feed 1, the reaction mixture was subjected to the following temperature program: heating to 60° C. over 60 minutes, continuous increase of the temperature from 60 to 70° C. over a period of 120 minutes, increase to 85° C. over a period of 30 minutes and maintaining of this temperature for 60 minutes. Feed 2 was then added, and feed 3 was introduced at 85° C. over a period of 60 minutes. The mixture was then cooled to room temperature.

This gave a dispersion having a solids content of 44.2% by weight and a mean particle size of (D50)=7.55 μm (z-average determined by means of light scattering).

Example 10

Aqueous Phase
470.60 g of DI water (DI=fully deionized water)
2.40 g of a 40.70% strength aqueous solution of (cross-linked n-butyl acrylate dispersion having a particle size D(50)=80 nm) (BASF)
0.76 g of sodium bicarbonate
0.60 g of potassium peroxodisulfate Feed 1
116.00 g of DI water (DI=fully dionized water)
6.00 g of a 40% strength aqueous solution of Emulgator K 30 (Lanxess)
Feed 2
175.00 g of n-butyl acrylate
5.00 g of Laromer DCPA
20.00 g of fipronil (90.2% pure, technical active ingredient)

a) The aqueous phase above was initially charged at room temperature and then heated to 65° C. Feeds 1 and 2 were metered in over a period of 3.5 hours. The mixture was then post-polymerized for 2 hours and then cooled to room temperature.

This gave a dispersion having a solids content of 22.5% by weight and a mean particle size of (D50)=430 nm (z-average determined by means of light scattering).

Example 11

Aqueous Phase
583.19 g of DI water (DI=fully deionized water)
13.33 g of a 15% strength aqueous solution of Disponil SDS G
2.00 g of a 2.5% by weight strength aqueous solution of sodium nitrite
Oil Phase
20.00 g of 1,4-butanediol diacrylate
20.00 g of methyl methacrylate
315.00 g of Agnique KE 3658
148.84 g of fipronil (90.7% pure, technical active ingredient)
10.00 g of methacrylic acid
Feed 1
3.53 g of a 75% by weight strength solution of tert-butyl perpivalate in aliphatic hydrocarbons
Feed 2
5.00 g of a 10% by weight strength aqueous solution of tert-butyl hydroperoxide
Feed 3
38.71 g of a 0.65% by weight strength aqueous solution of ascorbic acid a) The aqueous phase above was initially charged at room temperature. The oil phase was added and the mixture was dispersed with a high-speed dissolver stirrer at 5000 rpm. 30 minutes of dispersion gave a stable emulsion.

b) Following the introduction of feed 1, the reaction mixture was subjected to the following temperature program: heating to 60° C. over 60 minutes, continuous increase of the temperature from 60 to 70° C. over a period of 120 minutes, increase to 85° C. over a period of 30 minutes and maintaining of this temperature for 60 minutes. Feed 2 was then added, and feed 3 was introduced at 85° C. over a period of 60 minutes. The mixture was then cooled to room temperature.

This gave a dispersion having a solids content of 20.0% by weight and a mean particle size of (D50)=1.8 µm (z-average determined by means of light scattering).

Example 12

Aqueous Phase
323.81 g of DI water (DI=fully deionized water)
96.0 g of a 15% strength aqueous solution of Disponil SDS 15
Oil Phase
256.97 g of methyl methacrylate
23.04 g of stearyl methacrylate
7.99 g of methacrylic acid
0.87 g of 1,4-butanediol diacrylate
80.27 g of fipronil (89.70% pure, technical active ingredient)
Feed 1
12.41 g of DI water
2.07 g of tert-butyl hydroperoxide (10% strength in water)
Feed 2
2.88 g of Rongalit C
37.24 g of DI water a) The oil phase was pre-emulsified in the aqueous phase for 30 minutes. The emulsion was cooled and sonicated using a Branson Sonifier 450 ultrasound processor at 100% power for 10 minutes.

b) With stirring, the initial charge was heated to 40° C., and feed 1 was added. 30% of feed 2 were then added. The remainder of feed 2 was then added over a period of 60 minutes. After the metered addition, the mixture was heated to 60° C. over a period of 20 minutes and post-polymerized for 60 minutes. The mixture was then cooled to room temperature and the dispersion obtained was adjusted to pH 8.

This gave a dispersion having a solids content of 43.5% by weight and a mean particle size of (D50)=58.3 nm (HPPS).

Example 13

Aqueous Phase
415.06 g of DI water (DI=fully deionized water)
13.96 g of a 15% strength aqueous solution of Disponil SDS G
Oil Phase
208.80 g of methyl methacrylate
10.32 g of stearyl methacrylate
16.76 g of pentaerythritol tetraacrylate
45.98 g of fipronil (89.70% pure, technical active ingredient)
6.44 g of 1,4-butanediol diacrylate
6.44 g of methacrylic acid
Feed 1
100.96 g of DI water
2.06 g of sodium peroxodisulfate
Feed 2
2.75 g of a 10% strength aqueous tert-butyl hydroperoxide solution
Feed 3
12.03 g of DI water
0.17 g of L(+)-ascorbic acid a) The oil phase was pre-emulsified in the aqueous phase for 30 minutes. The emulsion was cooled and sonicated using a Branson Sonifier 450 ultrasound processor at 100% power for 10 minutes.

b) 175 g of a) were initially charged and heated to 80° C. Once the temperature had been reached, 5.3 g of feed 1 were added and the mixture was initially polymerized for 5 minutes. The remainder of a) was metered in over a period of 60 minutes. At the same time, the remainder of feed 1 was metered in over a period of 160 minutes. After 60 minutes of post-polymerization, feed 2 was added, followed by the metered addition of feed 3 over a period of 60 minutes. The mixture was then cooled to room temperature.

This gave a dispersion having a solids content of 32.5% by weight and a mean particle size of (D50)=148.6 nm (HPPS).

Example 14

Aqueous Phase 418.37 g of DI water (DI=fully deionized water)

93.33 g of a 15% strength aqueous solution of Disponil SDS 15

Oil Phase 252.00 g of methyl methacrylate 12.46 g of hexadecane 20.23 g of pentaerythritol tetraacrylate 55.48 g of fipronil (89.70% pure, technical active ingredient)

7.77 g of 1,4-butanediol diacrylate 7.77 g of methacrylic acid

Feed 1

14.10 g of a 10% strength aqueous tert-butyl hydroperoxide solution

Using HPLC-MSD, it was measured how many % of the amount of fipronil originally applied (625 ppm, 37.5 mg) were located in the segments of the column (0-2.5 cm, 2.5-7.5 cm, 7.5-12.5 cm, 12.5-17.5 cm and 17.5-22.5 cm).

The soil mobility relative to the commercial product Termidor SC was calculated using the method below:

Soil mobility=(amount of fipronil [%] in segment 1)×2.5+(amount of fipronil [%] in segment 2)×7.5+(amount of fipronil [%] in segment 3)×12.5+ . . . +(amount of fipronil [%] in segment 6)×27.5/(amount of fipronil [%] in segment 1 Termidor SC)×2.5+(amount of fipronil [%] in segment 2 Termidor SC)×7.5+(amount of fipronil [%] in segment 3 Termidor SC)×12.5+ . . . +(amount of fipronil [%] in segment 6 Termidor SC)×27.5)

The results are compiled in tabular form below.

| Ex. no. | S1 [%] (0.0-2.5 cm) | S2 [%] (2.5-7.5 cm) | S3 [%] (7.5-12.5 cm) | S4 [%] (12.5-17.5 cm) | S5 [%] (17.5-22.5 cm) | S6 [%] (22.5-27.5 cm) |
|---|---|---|---|---|---|---|
| Termidor SC | 83 | 17 | 0 | 0 | 0 | 0 |
| 1 | 27 | 53 | 20 | 0 | 0 | 0 |
| 2 | 16 | 50 | 32 | 2 | 0 | 0 |
| 3 | 11 | 31 | 37 | 15 | 6 | 0 |
| 4 | 8 | 24 | 30 | 26 | 12 | 0 |
| 5 | 9 | 23 | 28 | 30 | 11 | 0 |
| 6 | 13 | 45 | 29 | 13 | 0 | 0 |
| 7 | 10 | 42 | 42 | 6 | 0 | 0 |
| 8 | 20 | 51.8 | 22 | 6 | 0.2 | 0 |
| 9 | 43 | 55 | 2 | 0 | 0 | 0 |
| 10 | 25 | 58 | 17 | 0 | 0 | 0 |
| 11 | 21 | 52 | 25 | 2 | 0 | 0 |

Feed 2

36.21 g of DI water 2.80 g of Rongalit C a) The oil phase was pre-emulsified in the aqueous phase for 30 minutes. The emulsion was cooled and sonicated using a Branson Sonifier 450 ultrasound processor at 100% power for 10 minutes.

b) With stirring, the initial charge was heated to 40° C., and feed 1 was added. 30% of feed 2 were then added. The remainder of feed 2 was then added over a period of 60 minutes. After the metered addition, the mixture was heated to 60° C. over a period of 20 minutes and post-polymerized for 60 minutes. The mixture was then cooled to room temperature and the dispersion obtained was adjusted to pH 8.

This gave a dispersion having a solids content of 39.3% by weight and a mean particle size of (D50)=65.8 nm (HPPS).

Determination of the Soil Mobility

Design of the Experiment

With the aid of a vibrator, a glass column consisting of six segmentes (S1-S6) and having a length of 27.5 cm, a diameter of 5 cm and a surface area (of a cross section) of 19.6 $cm^2$ was filled with soil (LUFA 2.3 (sandy loam [USDA], pH 7.2, air-dried, TOC (total organic carbon (organic carbon in the soil, stated in % of the soil dry mass)) 1%, density 1.24 $g/cm^3$ max WHC (water holding capacity (a measure of the soil humidity, which is frequently stated in % of the maximum water holding capacity)) 28.9 g/100 g).

Insecticide formulations according to the invention and, as comparative formulation, Termidor SC were applied to this column (60 ml, comprising 37.5 mg of fipronil (625 ppm).

Columns S1-S6 state the fipronil concentration in [%] in the respective soil segment, based on the total concentration of fipronil employed. It is found that, when the formulations according to the invention (Examples 1-11) are used, the soil mobility of fipronil is increased markedly compared to the Termidor SC formulation.

The tests show that, using the formulation according to the invention, the active ingredient penetrates into the relevant regions of 0-6 inches (15.24 cm), whereas commercial formulations such as Termidor SC only penetrate into regions up to a depth of 7.5 cm. Furthermore, it is advantageous that, using the formulation according to the invention, the active ingredient is not transported in regions of below 27.5 cm, so that leaching of the active ingredients into the groundwater is prevented.

The invention claimed is:

1. A polymer particle, consisting essentially of:

i) an insecticide fipronil; and ii) at least one water-insoluble polymer P1, wherein the at least one water-insoluble polymer P1 is a water-insoluble polymer, obtained by polymerization of M1.1) 30 to 80% by weight, based on P1, of at least one monomer (M I) selected from the group consisting of the $C_1$-$C_{24}$-alkyl esters of acrylic acid, $C_1$-$C_{24}$-alkyl esters of methacrylic acid and methacrylonitrile, M1.2) 20 to 60% by weight, based on P1, of at least one monomer (M II), selected from the group consisting of butanediol diacrylate, trimethylolpropane triacrylate, trimethylolpropane trimethacrylate, pentaerythritol triallyl ether, pentaerythritol triacrylate and pentaerythritol tetraacrylate, and M1.3) 5 to 40% by weight, based on P1, of at least one further monomer (M III) which is structurally different from monomers (M I) and (M II), wherein M III is either acrylic acid or methacrylic acid.

2. The polymer particle according to claim 1, wherein the polymerization is carried out by mini-emulsion polymerization.

3. An insecticide formulation consisting essentially of comprising the polymer particle according to claim 1.

4. The insecticide formulation according to claim 3, wherein the polymerization is carried out by mini-emulsion polymerization.

5. A method for controlling soil-dwelling invertebrate pests, comprising applying onto or into a soil an insecticide formulation consisting essentially of comprising the polymer particle according to claim 1.

6. The method according to claim 5, wherein the polymerization is carried out by mini-emulsion polymerization.

7. A method for improving the soil mobility of sparingly soluble insecticides comprising applying onto or into the soil an insecticide formulation consisting essentially of comprising the polymer particle according to claim 1.

8. The method according to claim 7, wherein the polymerization is carried out by mini-emulsion polymerization.

* * * * *